US012789093B2

(12) United States Patent
Chen

(10) Patent No.: US 12,789,093 B2
(45) Date of Patent: Nov. 10, 2026

(54) VIRTUAL CHARACTER STATE SETTING METHOD

(71) Applicant: Tencent Technology (Shenzhen) Company Limited, Shenzhen (CN)

(72) Inventor: Teng Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 285 days.

(21) Appl. No.: 18/771,941

(22) Filed: Jul. 12, 2024

(65) Prior Publication Data

US 2024/0367047 A1 Nov. 7, 2024

Related U.S. Application Data

(63) Continuation of application No. PCT/CN2023/099305, filed on Jun. 9, 2023.

(30) Foreign Application Priority Data

Aug. 23, 2022 (CN) ........................ 202211015071.X

(51) Int. Cl.
*G06F 3/0488* (2022.01)
*A63F 13/52* (2014.01)
*A63F 13/55* (2014.01)

(52) U.S. Cl.
CPC .............. *A63F 13/55* (2014.09); *A63F 13/52* (2014.09)

(58) Field of Classification Search
CPC ................................. A63F 13/55; A63F 13/52
See application file for complete search history.

(56) References Cited

U.S. PATENT DOCUMENTS 6,584,494 B1 * 6/2003 Manabe .............. H04L 12/1827 709/224
8,021,220 B2 * 9/2011 Sakamoto ............... A63F 13/45 273/317.1

(Continued)

FOREIGN PATENT DOCUMENTS

CN 114466213 A 5/2022
JP 2004-259206 A 9/2004

(Continued)

OTHER PUBLICATIONS

Office Action received for Korean Patent Application No. 10-2024-7034825, mailed on Jan. 13, 2026, 10 pages (51 pages of English Translation and 5 pages of Original Document).

(Continued)

*Primary Examiner* — Linh K Pham
(74) *Attorney, Agent, or Firm* — ARENTFOX SCHIFF LLP

(57) ABSTRACT

In a virtual character state setting method, a first plurality of virtual characters in a state display interface of an application is displayed. The first plurality of virtual characters includes a target virtual character which is associated with a target account of the application. A current state of the target virtual character based on the first state identifier is configured in response to a copy operation on a first state identifier in the state display interface. The first state identifier is displayed as the current state of the target virtual character in the state display interface. The first state identifier being a state identifier from the first plurality of virtual characters.

19 Claims, 17 Drawing Sheets

(56) References Cited

U.S. PATENT DOCUMENTS

| | | | | |
|---|---|---|---|---|
| 8,439,733 | B2 * | 5/2013 | Kay | G10H 1/368 463/7 |
| 2005/0261032 | A1 * | 11/2005 | Seo | A63F 13/825 455/566 |
| 2006/0223602 | A1 * | 10/2006 | Hamamoto | A63F 13/822 463/1 |
| 2009/0112666 | A1 * | 4/2009 | Guo | G06Q 10/06 705/7.15 |
| 2009/0300525 | A1 * | 12/2009 | Jolliff | H04M 1/72427 715/764 |
| 2014/0113718 | A1 * | 4/2014 | Norman | A63F 13/822 463/31 |
| 2014/0344718 | A1 * | 11/2014 | Rapaport | H04L 67/306 715/753 |
| 2015/0254275 | A1 * | 9/2015 | Kikuchi | A63F 13/61 707/751 |
| 2017/0209789 | A1 * | 7/2017 | Ferrazzino | A63F 13/219 |
| 2020/0223352 | A1 * | 7/2020 | Toshio Kimura | B60Q 1/5037 |
| 2020/0360806 | A1 * | 11/2020 | Sun | A63F 13/52 |
| 2021/0409535 | A1 | 12/2021 | Mourkogiannis et al. | |

FOREIGN PATENT DOCUMENTS

| | | | | |
|---|---|---|---|---|
| JP | 2013-149239 A | | 8/2013 | |
| KR | 10-2022-0088924 A | | 6/2022 | |
| WO | WO-2024260085 A9 | * | 2/2025 | A63F 13/58 |

OTHER PUBLICATIONS

Dushuxingw ANLILU59, "How to set up other people's status with QQ", Jingyan.Baidu, Mar. 27, 2022.

International Search Report and Written Opinion received for PCT Patent Application No. PCT/CN2023/099305, mailed on Aug. 21, 2023, 16 pages (8 pages of English Translation and 8 pages of Original Document).

Jiangxi, Breaking the news of the linkage of major IPs, what is QQ's new feature "Status Square"?, Internet science and technology museum, Baidu, Available online at <https://baijiahao.baidu.com/s?id=1736509793568218875&wfr=,1pider&jc1r=pc>, Jun. 24, 2022, 3 pages.

Office Action received for Japanese Patent Application No. 2024-534415, mailed on Jun. 24, 2025, 6 pages (3 pages of English Translation and 3 pages of Original Document).

Quanji Nadianshi, It's Already Very Hot Only in Closed Beta, What is "QQ Status Square?", QQ Status Square QQ, Jul. 19, 2022.

Xiahuchededachang, "How to Set Wechat Status of Wechat Friends?", Jingyan Biadu, Available on internet at <https://jingyan.baidu.com/article/86f4a73e71195876d7526959.html>, Aug. 21, 2021, 2 pages.

Office Action received for Chinese Patent Application No. 202211015071.X, mailed on Apr. 11, 2026, 26 pages (13 pages of English Translation and 13 pages of Original Document).

* cited by examiner (a) (b)

(a) (b)

(a)

(b)

(a)

(b)

VIRTUAL CHARACTER STATE SETTING METHOD

RELATED APPLICATIONS

The present application is a continuation of International Application No. PCT/CN2023/099305, filed Jun. 9, 2023, which claims priority to Chinese Patent Application No. 202211015071X, filed on Aug. 23, 2022. The entire disclosures of the prior applications are hereby incorporated by reference.

FIELD OF THE TECHNOLOGY

This application relates to the field of computer technologies, including to a virtual character control technology.

BACKGROUND OF THE DISCLOSURE

In a virtual social scene, to implement a personalized expression of a user, the user is generally supported to set a state of a virtual character controlled by the user. For example, when an action state of eating is set, it represents that the virtual character controlled by the user is eating. When a state of lifting a dumbbell is set, it represents that the virtual character controlled by the user is exercising. To increase entertainment value of interactions between users, when a target user sees that another friend sets an interesting state for a reference virtual character controlled by the friend, the target user may also set a state of a target virtual character controlled by the target user to the same state as the reference virtual character.

In the related art, a target virtual character state setting method includes: selecting a reference virtual character in a state display interface of a target application, tapping/clicking to enter a character detail page of the reference virtual character, and copying a state of the reference virtual character to the target virtual character by using a state setting control on the character detail page. After the target user returns to the state display interface, it may be learned that the state of the target virtual character changes to the same state as the reference virtual character.

However, the foregoing virtual character state setting method requires switching from the state display interface of the target application to the character detail page of the reference virtual character, and then returning from the character detail page to the state display interface to view a state change of the target virtual character. In other words, virtual character state setting needs to be implemented in different interfaces, to cause a complex operation and low state setting efficiency.

SUMMARY

This disclosure provides a virtual character state setting method and apparatus, a storage medium, and an electronic device, to simplify an operation of setting a virtual character state and improve efficiency of setting a virtual character state.

According to an aspect of this disclosure, a virtual character state setting method is provided. In the method, a first plurality of virtual characters in a state display interface of an application is displayed. The first plurality of virtual characters includes a target virtual character which is associated with a target account of the application. A current state of the target virtual character based on the first state identifier is configured in response to a trigger operation on a first state identifier in the state display interface. The first state identifier is displayed as the current state of the target virtual character in the state display interface. The first state identifier being a state identifier from the first plurality of virtual characters.

According to another aspect of this disclosure, a virtual character state setting apparatus is further provided, including processing circuitry is provided. The processing circuitry is configured to display a first plurality of virtual characters in a state display interface of an application. The first plurality of virtual characters includes a target virtual character which is associated with a target account of the application. The processing circuitry is configured to configure a current state of the target virtual character based on the first state identifier in response to a trigger operation on a first state identifier in the state display interface. The processing circuitry is configured to display the first state identifier as the current state of the target virtual character in the state display interface. The first state identifier being a state identifier from the first plurality of virtual characters. According to still another aspect of this disclosure, a non-transitory computer-readable storage medium is further provided, having a computer program stored thereon, the computer program, when run, performing the foregoing virtual character state setting method.

According to still another aspect of this disclosure, a computer program product is further provided, including a computer program/instructions, the computer program/instructions, when executed by a processor, performing operations of the foregoing virtual character state setting method.

According to still another aspect of this disclosure, an electronic device is further provided, including a memory and a processor, the memory having a computer program stored therein, and the processor being configured to perform the foregoing virtual character state setting method by using the computer program.

According to an aspect of this disclosure, in the state display interface that displays the state identifiers of the first group of virtual characters and the target virtual character, in response to the trigger operation on the first state identifier in the state display interface, the first state identifier and the first state corresponding to the first state identifier are directly copied to the target virtual character. In other words, a one-key operation is performed on the first state identifier in the state display interface to set the state of the target virtual character to the same state as the first virtual character, avoiding switch between different display interfaces and reducing operations in a plurality of display interfaces, so that a technical problem of high complexity in setting a virtual character state is resolved and convenience of setting a virtual character state is improved.

DETAILED DESCRIPTION

To aid a person skilled in the art better understand the solutions of this disclosure, the following clearly and completely describes the technical solutions in this disclosure with reference to the accompanying drawings in this disclosure. All other aspects obtained by a person of ordinary skill in the art based on this disclosure without creative efforts shall fall within the protection scope of this disclosure.

In this specification, claims, and accompanying drawings of this disclosure, the terms "first", "second", and the like are intended to distinguish similar objects but do not necessarily indicate a specific order or sequence. Such used data is interchangeable where appropriate, so that this disclosure described here can be implemented in an order other than those illustrated or described here. Moreover, the terms "include", "have", and any other variants are intended to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

Figure 1:
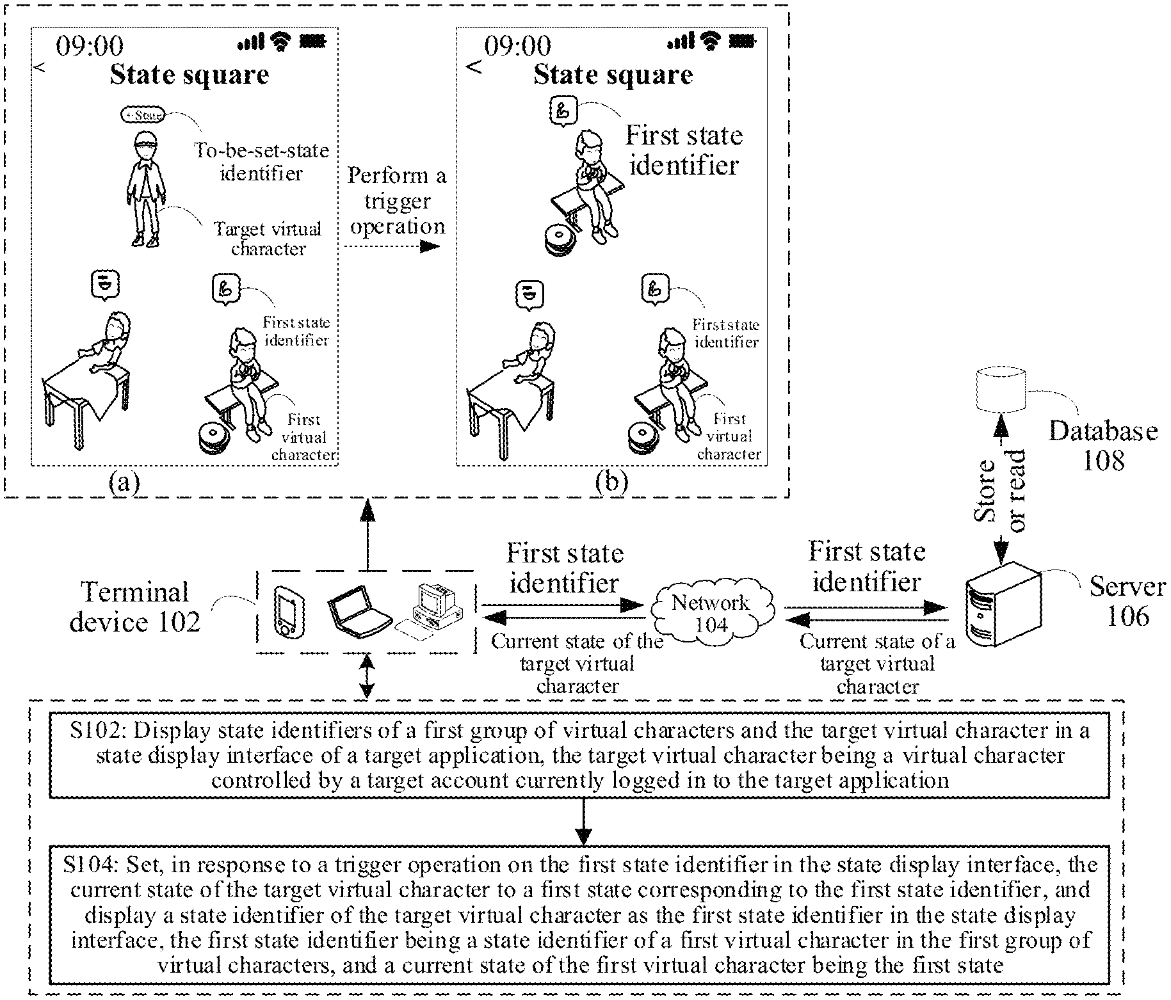
FIG. 1 is a schematic diagram of an disclosure scenario of a virtual character state setting method according to an aspect of this disclosure.

According to an aspect of this disclosure, a virtual character state setting method is provided. As a implementation, the foregoing virtual character state setting method may be, but is not limited to, applied to an application scenario shown in FIG. 1. In the application scenario shown in FIG. 1, a terminal device 102 may, but is not limited to, communicate with a server 106 via a network 104, and the server 106 may, but is not limited to, perform an operation, such as a writing data operation or a reading data operation, on a database 108. The foregoing terminal device 102 may include, but is not limited to, a human-machine interaction screen, a processor, and a memory. The foregoing human-machine interaction screen may be, but is not limited to, configured to display a state of a target virtual character, a state identifier of a first group of virtual characters, and the like. The foregoing processor may be, but is not limited to, configured to perform a corresponding operation in response to the foregoing human-machine interaction operation, or generate a corresponding instruction, and send the generated instruction to the server 106. The foregoing memory is configured to store related processing data, such as a first state identifier, a relationship between a target account and a target virtual character, and the like.

The following operations in the virtual character state setting method may be performed by the terminal device 102. Operation S102: Display state identifiers of a first group of virtual characters and a target virtual character in a state display interface of a target application, the target virtual character being a virtual character controlled by a target account currently logged in to the target application. Operation S104: Set, in response to a trigger operation, for example a copy operation, on a first state identifier in the state display interface, a current state of the target virtual character to a first state corresponding to the first state identifier, and display a state identifier of the target virtual character as the first state identifier in the state display interface, the first state identifier being a state identifier of a first virtual character in the first group of virtual characters, and a current state of the first virtual character being the first state.

As an example, an execution entity of the foregoing operation S102 to operation S104 is not limited in this example. For example, the foregoing operation S102 to operation S104 may be performed on the terminal device 102 or the server 106, or may be partially performed on the terminal device 102 and partially performed on the server 106 communicating with the terminal device 102.

In the foregoing manner, in the state display interface that displays the state identifiers of the first group of virtual characters and the target virtual character, in response to the trigger operation on the first state identifier in the state display interface, the first state identifier is directly copied to the target virtual character. In other words, a state of the first virtual character is copied to the target virtual character. In other words, a one-key operation is performed on the first state identifier in the state display interface to set the state of the target virtual character to the same state as the first virtual character, avoiding switch between different display interfaces and reducing operations in a plurality of display interfaces, so that a technical problem of high complexity in setting a virtual character state is resolved and convenience of setting a virtual character state is improved.

Figure 2:
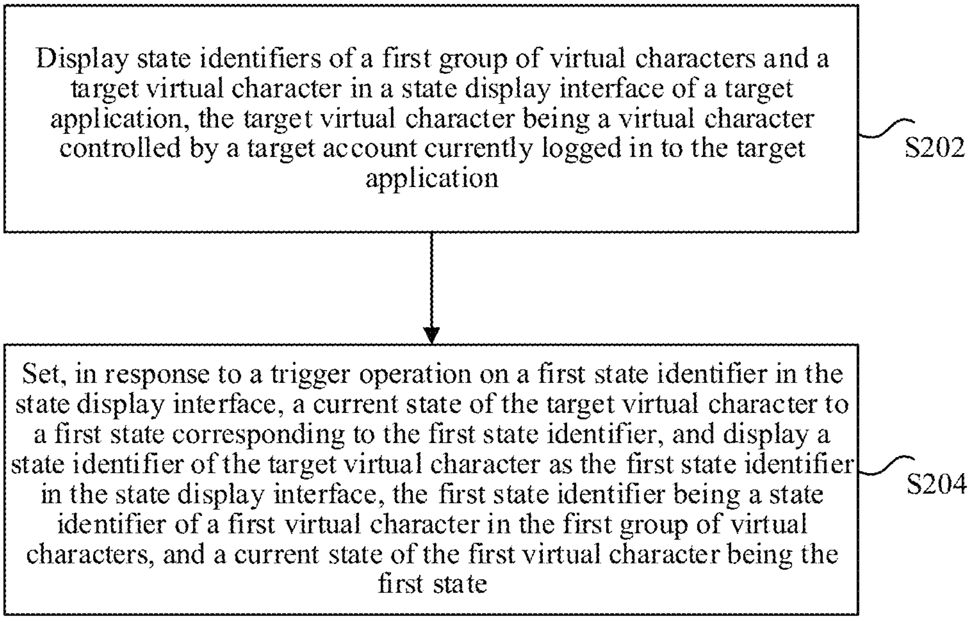
FIG. 2 is a flowchart of a virtual character state setting method according to an aspect of this disclosure.

To resolve the foregoing problem of high complexity in setting a virtual character state, an example of this disclosure provides a virtual character state setting method. FIG. 2 is a flowchart of a virtual character state setting method according to an example of this disclosure. The process includes the following operations.

Operation S202: Display state identifiers of a first group of virtual characters and a target virtual character in a state display interface of a target application, the target virtual character being a virtual character controlled by a target account currently logged in to the target application.

In a virtual social scene, each user controls a virtual character figure and sets a corresponding state for the virtual character to express a mood at the moment or what the user is doing.

The target application is an application that supports the user to create and control a virtual character. The target application may be, for example, a game application, a social application, a media playback application, or a shopping application. The state display interface is an interface configured to display the virtual character state in the target application. The state display interface may display the state identifiers of the first group of virtual characters and the target virtual character controlled by the target account currently logged in to the target application. The first group of virtual characters includes at least one virtual character related to the target virtual character. For example, the virtual character may be a virtual character controlled by a friend of the target account. For another example, the virtual character may be a virtual character participating in the same game as the target virtual character controlled by the target account. The state identifiers of the first group of virtual characters include state identifiers of virtual characters in the first group of virtual characters. The state identifier of the virtual character is configured for identifying a current state of the virtual character.

Figure 3:
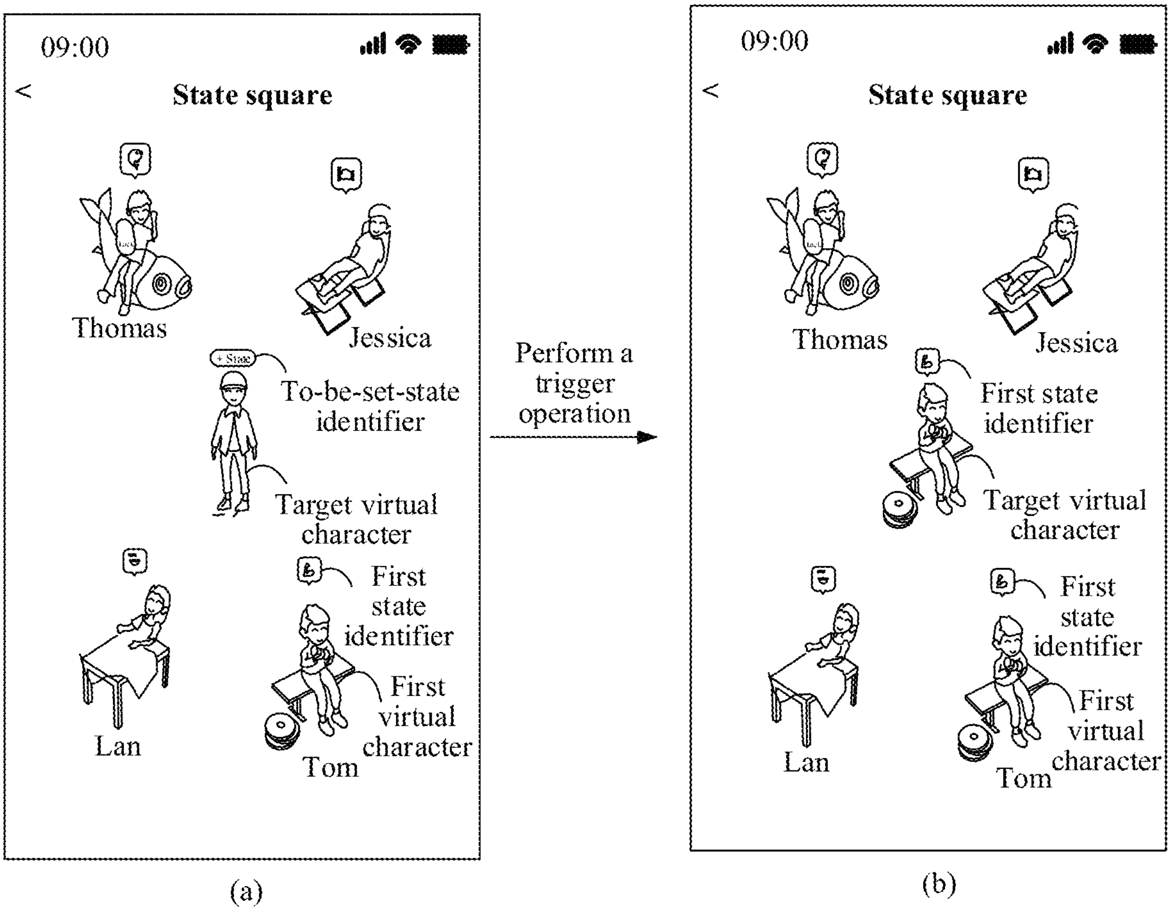
FIG. 3 is a schematic diagram of a virtual character state setting method according to an aspect of this disclosure.

For example, as shown in section (a) of FIG. 3, the state display interface of the target application to which the target account is logged in includes the target virtual character and the first group of virtual characters other than the target virtual character, for example, Jessica, Lan, and Tom. States of the virtual characters in the first group of virtual characters can be learned based on the state identifiers of the first group of virtual characters. For example, it may be learned, based on a state identifier of the virtual character Jessica, that Jessica is sleeping. It may be learned, based on a state identifier of the virtual character Lan, that Lan is eating.

The foregoing state display interface is only an example and is not limited thereto. For example, a quantity of virtual characters in the state display interface may be 3, 4, or 5. State identifiers of the virtual characters each may be any one of preset state identifiers, or the like.

Operation S204: Set, in response to a trigger operation on a first state identifier in the state display interface, a current state of the target virtual character to a first state corresponding to the first state identifier, and display a state identifier of the target virtual character as the first state identifier in the state display interface, the first state identifier being a state identifier of a first virtual character in the first group of virtual characters, and a current state of the first virtual character being the first state.

In this example of this disclosure, states of virtual characters in a virtual scene each include, but are not limited to, two situations: one is that a state is null, and the other is that a status is preset. Correspondingly, the states of the virtual character shown in section (a) of FIG. 3 also include, but are not limited to, the foregoing two situations. The following describes a specific example of how to respectively update two different states of a virtual character to the first state identifier.

As an example, during the displaying state identifiers of a first group of virtual characters and a target virtual character in a state display interface of a target application, the method includes: displaying a to-be-set-state identifier of the target virtual character in the state display interface, the to-be-set-state identifier representing that the current state of the target virtual character is null.

The setting the current state of the target virtual character to the first state corresponding to the first state identifier, and displaying the state identifier of the target virtual character as the first state identifier in the state display interface includes: setting the current state of the target virtual character to the first state, and updating the state identifier of the target virtual character from the to-be-set-state identifier to the first state identifier in the state display interface.

As shown in section (a) of FIG. 3, assuming that a current state identifier of the target virtual character is the to-be-set-state identifier, it means that no state is preset for the target virtual character. After the first state identifier of the first virtual character is seen, if a state of the target virtual character is to be set to the first state corresponding to the first state identifier, the trigger operation is only needed be performed on the first state identifier in the state display interface to change the to-be-set-state identifier of the target virtual character to the first state identifier.

As shown in section (b) of FIG. 3, after the trigger operation is performed on the first state identifier, the state identifier of the target virtual character is updated from the to-be-set-state identifier to the first state identifier, and the state of the target virtual character is switched to the first state. The trigger operation on the first state identifier includes, but is not limited to, a touch and hold operation, a drag operation, and the like on the first state identifier. A detailed process of the trigger operation is described below with reference to a specific example.

As another example, during the displaying state identifiers of a first group of virtual characters and a target virtual character in a state display interface of a target application, the method further includes: displaying a third state identifier of the target virtual character in the state display interface, the third state identifier representing that the current state of the target virtual character is a third state.

The setting the current state of the target virtual character to the first state corresponding to the first state identifier, and displaying the state identifier of the target virtual character as the first state identifier in the state display interface further includes: updating the current state of the target virtual character from the third state to the first state, and updating the state identifier of the target virtual character from the third state identifier to the first state identifier in the state display interface.

Figure 4:
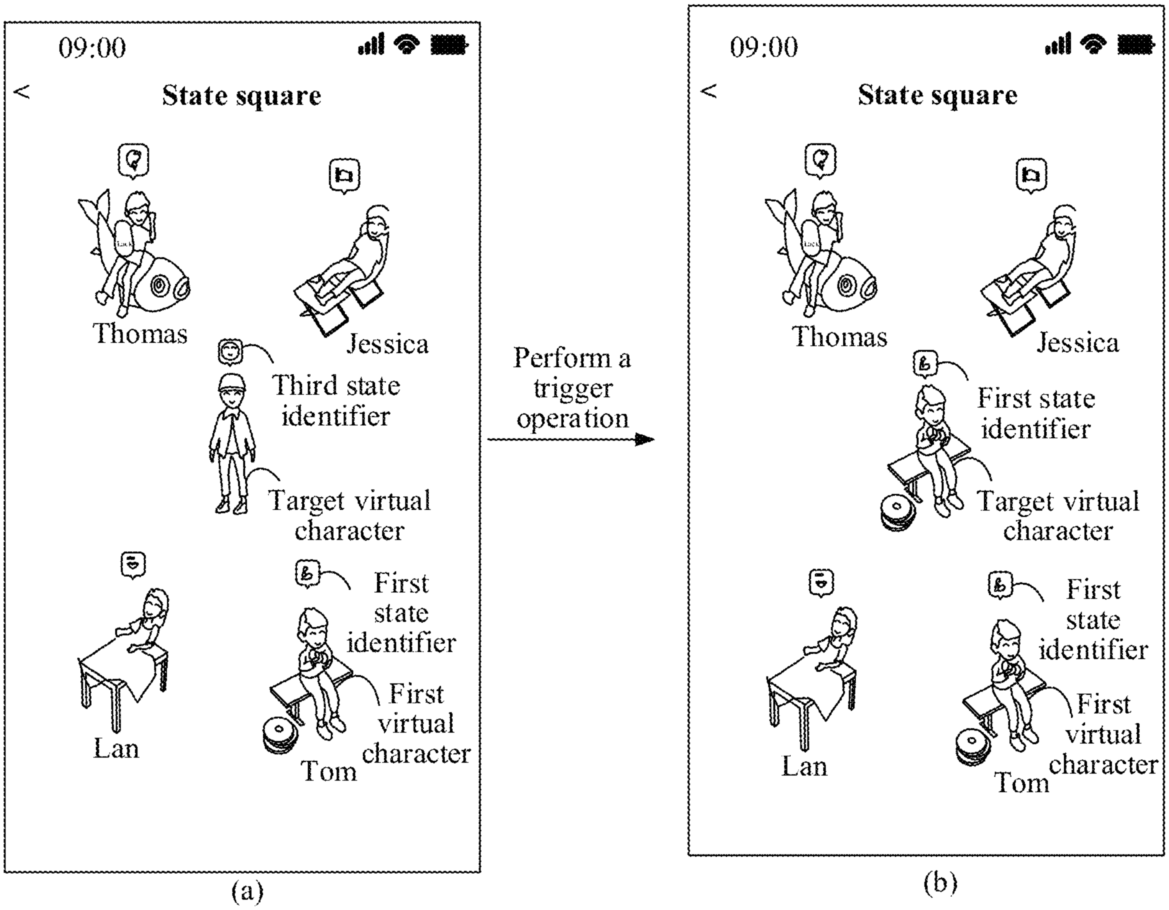
FIG. 4 is a schematic diagram of a virtual character state setting method according to an aspect of this disclosure.

As shown in section (a) of FIG. 4, assuming that the current state of the target virtual character is the third state corresponding to the third state identifier, after the first state identifier of the first virtual character is seen, if the state of the target virtual character is to be set to the first state corresponding to the first state identifier, the trigger operation is only needed be performed on the first state identifier in the state display interface to change the state identifier and the state of the target virtual character.

As shown in section (b) of FIG. 4, after the trigger operation is performed on the first state identifier, the state identifier of the target virtual character is updated from the third state identifier to the first state identifier. The trigger operation on the first state identifier includes, but is not limited to, a touch and hold operation, a drag operation, and the like on the first state identifier.

With reference to the foregoing example, it may be learned that during changing the state identifier of the target virtual character, selection and operation for the first state identifier, a display result of a changed state identifier of the target virtual character, and the like are all completed in the same state display interface of the target application. In other words, a one-key operation is performed on the first state identifier without switching the state display interface to change the state identifier and the state of the target virtual character, reducing operations for setting the virtual character state, so that a technical problem of high complexity in setting a virtual character state is resolved and convenience of setting a virtual character state is improved.

As an example, during the displaying state identifiers of a first group of virtual characters and a target virtual character in a state display interface of a target application, the foregoing method further includes: displaying action animations of the first group of virtual characters in the state display interface, the action animations of virtual characters in the first group of virtual characters respectively corresponding to the state identifiers of the virtual characters in the first group of virtual characters.

During the setting the current state of the target virtual character to the first state corresponding to the first state identifier, and displaying the state identifier of the target virtual character as the first state identifier in the state display interface, the foregoing method further includes: displaying an action animation of the target virtual character in the state display interface, both the action animation of the target virtual character and an action animation of the first virtual character corresponding to the first state identifier, and the action animation of the target virtual character being the same as the action animation of the first virtual character, or the action animation of the target virtual character being configured for showing that the target virtual character performs a first action, the action animation of the first virtual character being configured for showing that the first virtual character performs the first action, and the first action corresponding to the first state identifier.

It may be learned from examples shown in FIG. 3 and FIG. 4 that the state identifier of the target virtual character may be set to the first state identifier after the trigger operation is performed on the first state identifier. Then, after setting, a specific representation of the target virtual character in the state display interface includes, but is not limited to, at least one of the following forms.

(1) A figure and the state identifier of the target virtual character are updated.

As shown in FIG. 4, after the state identifier of the target virtual character is set based on the foregoing virtual character state setting method, the character figure of the target virtual character, the action animation of the target virtual character, and the third state identifier are directly replaced with a character figure of the first virtual character, the action animation of the first virtual character, and the first state identifier.

(2) Only the state identifier of the target virtual character is updated.

Figure 5:
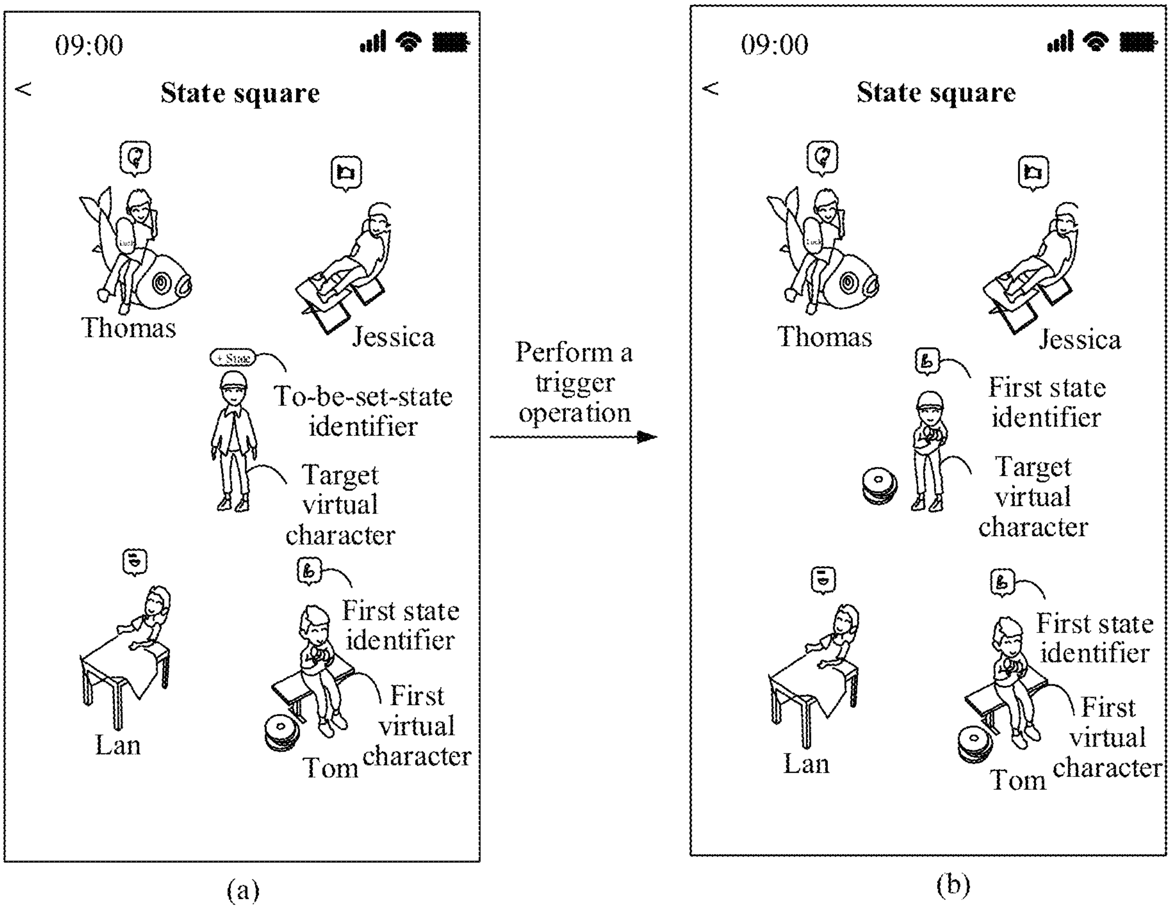
FIG. 5 is a schematic diagram of a virtual character state setting method according to an aspect of this disclosure.

As shown in section (a) of FIG. 5, assuming that the current state of the target virtual character is null, after the state identifier of the target virtual character is set based on the foregoing virtual character state setting method, only the to-be-set-state identifier of the target virtual character is updated to the first state identifier. In addition, an action performed by the target virtual character is changed to the same first action as the first virtual character, for example, an action of lifting a dumbbell. The figure of the target virtual character does not change.

It may be learned that according to the technical solution in this example of this disclosure, some or all of the state identifier of the target virtual character, the action animation of the target virtual character, and the character figure of the target virtual character may be updated through the one-key operation. This improves efficiency of setting a virtual character state, improves flexibility of setting a virtual character state, and increases entertainment value of virtual social.

As an example, the setting, in response to a trigger operation on a first state identifier in the state display interface, a current state of the target virtual character to a first state corresponding to the first state identifier, and displaying a state identifier of the target virtual character as the first state identifier in the state display interface includes:

displaying in the state display interface, in response to a first drag operation on the first state identifier in the state display interface, a first copy identifier that is moved following the first drag operation, the first copy identifier being the same as the first state identifier; and setting, in a case that the first copy identifier is moved to a preset determining area and the first drag operation is released, the current state of the target virtual character to the first state corresponding to the first state identifier, and displaying the state identifier of the target virtual character as the first state identifier in the state display interface.

Figure 6:
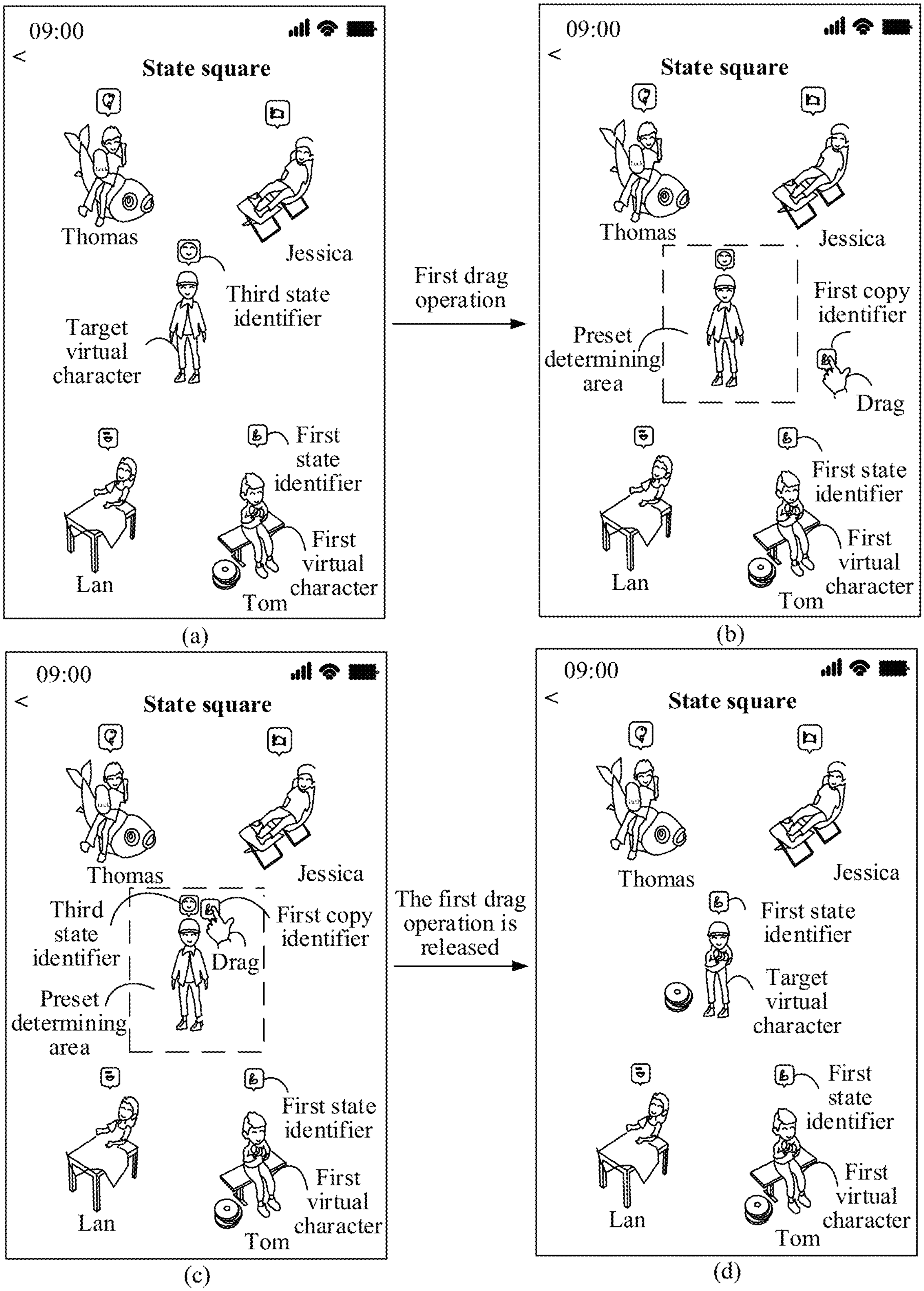
FIG. 6 is a schematic diagram of a virtual character state setting method according to an aspect of this disclosure.

As shown in section (a) of FIG. 6, assuming that the current state of the target virtual character is the third state corresponding to the third state identifier, in a case that the state of the target virtual character is set to the first state corresponding to the first state identifier, the first state identifier of the first virtual character is selected through an operation in the foregoing trigger operation (for example, touching and holding for preset duration), for example, touching and holding for 0.5 seconds, and a state copy mode is entered to copy the first state identifier to obtain the first copy identifier that is the same as the first state identifier.

The first copy identifier is moved following the first drag operation through a first drag operation as shown in section (b) of FIG. 6. When the first copy identifier is moved to a preset determining area as shown in section (c) of FIG. 6, the first drag operation is stopped to set the current state of the target virtual character to the first state corresponding to the first state identifier, for example, a state of lifting a dumbbell as shown in section (d) of FIG. 6.

The foregoing preset determining area may be, but is not limited to, an area where the target virtual character is located or a preset area in the state display interface. A specific process of setting the state of the target virtual character based on the two different determining areas is separately implemented, including:

setting, in a case that the first copy identifier is moved to an area that the target virtual character is located and the first drag operation is released, the current state of the target virtual character to the first state corresponding to the first state identifier, and displaying the state identifier of the target virtual character as the first state identifier in the state display interface, the preset determining area being the area that the target virtual character is located; or setting, in a case that the first copy identifier is moved to a preset area in the state display interface and the first drag operation is released, the current state of the target virtual character to the first state corresponding to the first state identifier, and displaying the state identifier of the target virtual character as the first state identifier in the state display interface, the preset determining area being the preset area in the state display interface.

As shown in section (c) of FIG. 6, when the first copy identifier is moved to the preset determining area where the target virtual character is located, if the drag operation on the first copy identifier is stopped, the third state identifier of the target virtual character can be set to the first copy identifier. In addition, the state of the target virtual character is also updated to the first state corresponding to the first copy identifier (the first state identifier), for example, the state of lifting a dumbbell, specifically, as shown in section (d) of FIG. 6.

The area where the target virtual character is located not only includes a position of the third state identifier and a position of the target virtual character as shown in section (c) of FIG. 6, but may also be anywhere within a dashed-line box as shown in section (c) of FIG. 6. In addition, there is no need to drag the first copy identifier completely into the dashed-line box. Provided that the first copy identifier overlaps the dashed-line box, it may be considered that the user wants to copy the first state corresponding to the first state identifier to the target virtual character. A client where the target account is on can transmit an ID parameter of the first state identifier to a backend. The backend responses to the setting to set the state of the target virtual character to the first state corresponding to the first state identifier.

Figure 7:
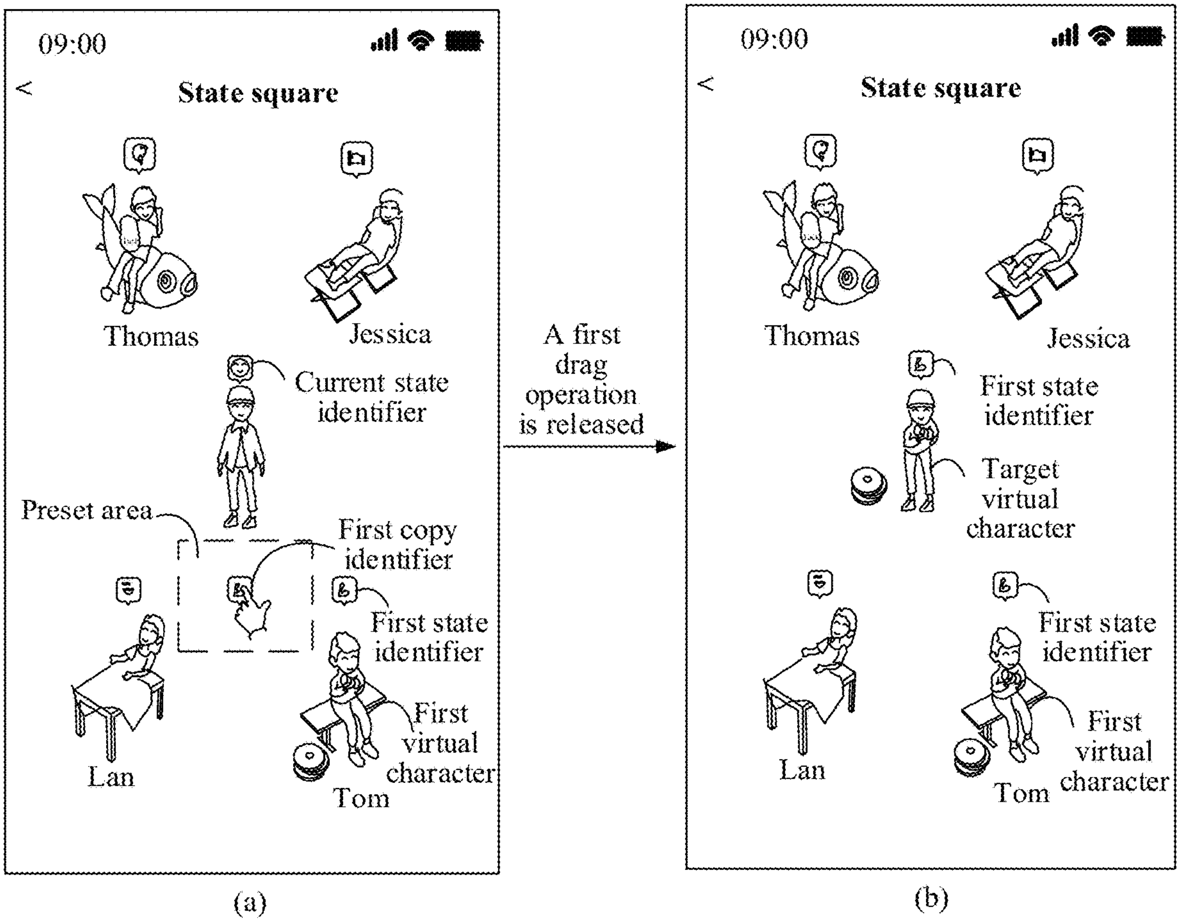
FIG. 7 is a schematic diagram of a virtual character state setting method according to an aspect of this disclosure.

In addition to the area where the target virtual character is located, the preset area in the state display interface as shown in section (a) of FIG. 7 may also be set as the preset determining area. Specifically, when the first copy identifier is moved to the preset determining area as shown in section (a) of FIG. 7, if the drag operation on the first copy identifier is stopped, the third state identifier of the target virtual character can be set to the first copy identifier. In addition, the state of the target virtual character is also updated to the first state corresponding to the first copy identifier (the first state identifier), for example, the state of lifting a dumbbell, specifically, as shown in section (b) of FIG. 7.

It is clear that the preset area in the state display interface shown in FIG. 7 is only an example and is not limited thereto. For example, the preset area may alternatively be a specified area on the left or the right of the target virtual character, or above the target virtual character.

The foregoing method is used to display the first copy identifier that is moved following the first drag operation in the state display interface, when the first copy identifier is moved to the preset determining area, the first state identifier is automatically copied to the target virtual character, and the state of the target virtual character is displayed as the first state corresponding to the first state identifier, to improve convenience of setting the virtual character state.

As an example, the trigger operation, in addition to the first drag operation on the first copy identifier in the foregoing example, performed on the first state identifier may alternatively be implemented by using a manner of the following state copy operation:

displaying a state copy control in the state display interface in response to a touch and hold operation on the first state identifier in the state display interface, the state copy control being configured to copy the current state of the first virtual character to the target virtual character; and setting, in response to a trigger operation on the state copy control in the state display interface, the current state of the target virtual character to the first state corresponding to the first state identifier, and displaying the state identifier of the target virtual character as the first state identifier in the state display interface.

Figure 8:
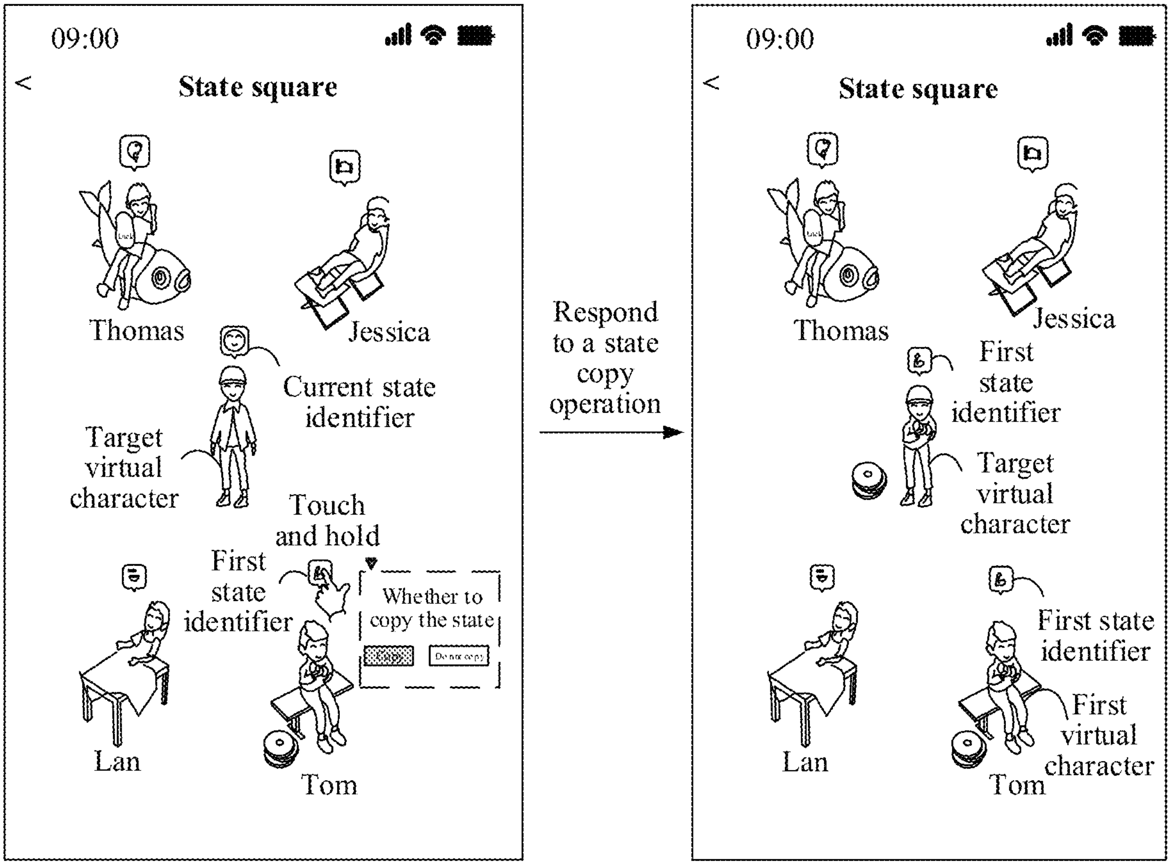
FIG. 8 is a schematic diagram of a virtual character state setting method according to an aspect of this disclosure.

As shown in section (a) of FIG. 8, in the state display interface, the first state identifier is touched and held to display a state copy tab, and then a "copy" or "do not copy" control is selected to determine whether to copy the first state identifier. In addition, in a case that the "copy" control is selected, the first state identifier and the first state corresponding to the first state identifier are directly copied to the target virtual character. Specifically, refer to section (b) of FIG. 8.

Different from the foregoing manner for setting the state of the target virtual character by touching and holding the first state identifier+the drag operation on the first copy identifier, in this example, the state of the target virtual character may be set by touching and holding the first state identifier+selecting a state option. This can reduce response time of state copying and improve efficiency of state setting.

In the state display interface of the target application, an actual virtual scene (for example, a state square) generally includes a plurality of different partial virtual scenes. A state display interface displayed after logging in to the target application is generally a default partial virtual scene, for example, a partial virtual scene to which the target virtual character belongs. However, when it is necessary to enter another partial virtual scene from the partial virtual scene, this may be implemented by switching a display scene of the state square, and a state identifier in a switched partial virtual scene may be set as the state identifier of the target virtual character, specifically, including:

switching a displayed virtual scene from a first partial virtual scene to a second partial virtual scene in the state display interface in response to a scene switching operation triggered in the state display interface, and displaying state identifiers of a second group of virtual characters located in the second partial virtual scene, the state identifiers of the first group of virtual characters being located in the first partial virtual scene; and setting, in response to a trigger operation on a second state identifier in the state display interface, the current state of the target virtual character to a second state corresponding to the second state identifier, and displaying the state identifier of the target virtual character as the second state identifier in the state display interface, the second state identifier being a state identifier of a second virtual character in the second group of virtual characters, and a current state of the second virtual character being the second state.

Figure 9:
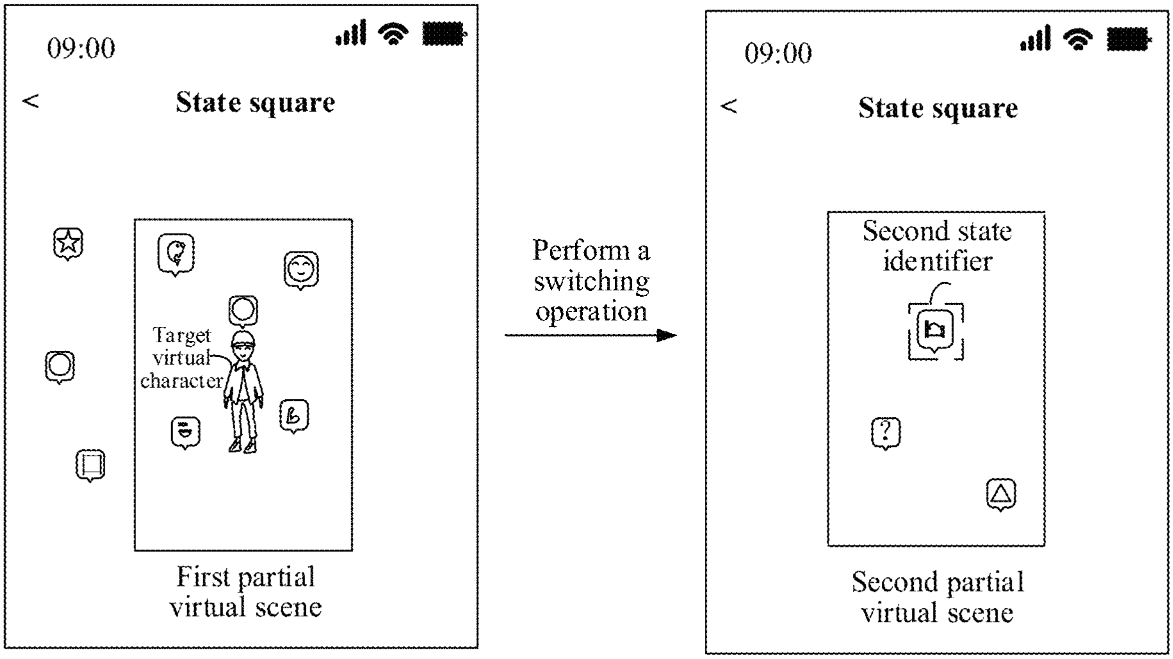
FIG. 9 is a schematic diagram of a virtual scene switching according to an aspect of this disclosure.

As shown in section (a) of FIG. 9, assuming that the first partial virtual scene is a partial virtual scene displayed by default when the state display interface is opened, and a state identifier that the target account wants to set is displayed in the second partial virtual scene, the virtual scene displayed in the state display interface is switched from the first partial virtual scene to the second partial virtual scene as shown in section (b) of FIG. 9 by performing the scene switching operation.

The first partial virtual scene and the second partial virtual scene are different partial virtual scenes that exist in the state square at the same time. The partial virtual scene displayed in the state display interface may be any one of the first partial virtual scene and the second partial virtual scene through the switching operation.

The same method as the trigger operation performed by the first state identifier is used to perform a trigger operation on the second state identifier in the second partial virtual scene to set the current state of the target virtual character to the second state corresponding to the second state identifier.

During switching the first partial virtual scene in the state display interface to the second partial virtual scene by performing the scene switching operation, the partial virtual scene is switched only, but the target virtual character is still located in the first partial virtual scene. In this case, an implementation of setting the current state of the target virtual character to the second state corresponding to the second state identifier is as follows:

displaying in the state display interface, in response to a second drag operation on the second state identifier in the state display interface in a case that the target virtual character is located in the first partial virtual scene, a second copy identifier that is moved following the second drag operation, the second copy identifier being the same as the second state identifier;

switching the displayed virtual scene from the second partial virtual scene to the first partial virtual scene in the state display interface in a case that the second copy identifier is moved across a scene to the first partial virtual scene; and setting, in a case that the second copy identifier is moved to the area that the target virtual character is located and the second drag operation is released, the current state of the target virtual character to the second state corresponding to the second state identifier, and displaying the state identifier of the target virtual character located in the first partial virtual scene as the second state identifier.

Figure 10:
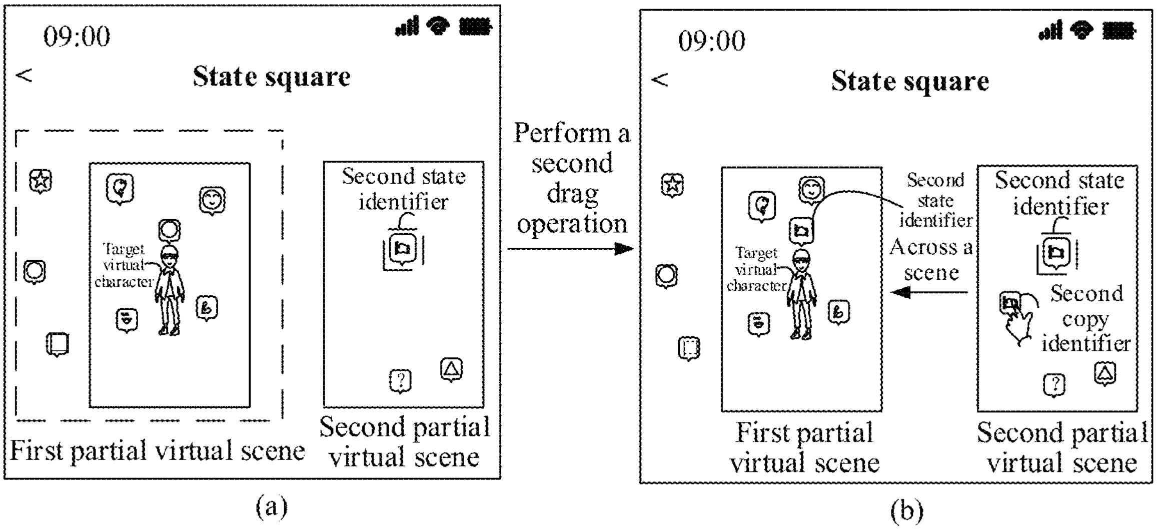
FIG. 10 is a schematic diagram of state copying and state setting after virtual scene switching according to an aspect of this disclosure.

As shown in section (a) of FIG. 10, in a case that the virtual scene displayed in the state display interface is switched from the first partial virtual scene to the second partial virtual scene, the target virtual character is still located in the first partial virtual scene, and the second state identifier is located in the second partial virtual scene. The second drag operation is performed on the second state identifier, so that the second copy identifier corresponding to the second state identifier is moved from the second partial virtual scene to the first partial virtual scene. When the second copy identifier is moved to a preset determining area in the first partial virtual scene, the second drag operation on the second copy identifier is released to switch the state identifier of the target virtual character to the second state identifier. In addition, the current state of the target virtual character is switched to the second state corresponding to the second state identifier.

Based on a distance between the virtual scenes, the first partial virtual scene and the second partial virtual scene may be two virtual scenes between which a distance is greater than or equal to a predetermined distance threshold, for example, two neighboring virtual scenes in the state square, and may alternatively be two virtual scenes with no overlapping portion, for example, there are another virtual scene between the first partial virtual scene and the second partial virtual scene. For the first partial virtual scene and the second partial virtual scene in the two situations, the foregoing method for setting the state of the target virtual character further includes:

switching, in a case that a distance between the first partial virtual scene and the second partial virtual scene is greater than or equal to a predetermined distance threshold, the displayed virtual scene from the second partial virtual scene to the first partial virtual scene in the state display interface when the second copy identifier is moved away from the second partial virtual scene; or switching, in a case that there is no overlapping portion between the first partial virtual scene and the second partial virtual scene, the displayed virtual scene from the second partial virtual scene to the first partial virtual scene in the state display interface when the second copy identifier is moved away from the second partial virtual scene.

The implementation of the foregoing method for setting the state of the target virtual character is further described below with reference to specific examples.

Example 1

As shown in section (a) of FIG. 11, assuming that a distance d between a first partial virtual scene and a second partial virtual scene is greater than or equal to a predetermined distance threshold Th, and the first partial virtual scene and the second partial virtual scene are two neighboring virtual scenes, specific operations of setting a current state of a target virtual character to a second state represented by a second state identifier are as follows.

S1102: Touch and hold the second state identifier to enter a state copy mode.

The second state identifier is located in the second partial virtual scene. A second copy identifier is displayed in the second partial virtual scene by touching and holding the second state identifier, for example, touching and holding for 0.5 seconds. The second copy identifier is the same as the second state identifier.

It is clear that the foregoing touching and holding for 0.5 seconds is only an example and is not limited thereto. For example, it may alternatively be touching and holding for 0.3 seconds or touching and holding for 0.6 seconds. In addition, touching and holding for preset duration may avoid conflict with a gesture of sliding a screen.

S1104: Perform operation (1) to perform a second drag operation on the second copy identifier, to cause the second copy identifier to be moved following the second drag operation to an edge of a state display interface where the second virtual scene is located.

S1106: Perform operation (2) to continue to perform the second drag operation, to cause the second copy identifier to be moved away from the second partial virtual scene and enters the first partial virtual scene.

S1108: Perform operation (3) to release the second drag operation when the second copy identifier is moved to an area where the target virtual character is located in the first partial virtual scene or a preset area in a state display interface.

S1110: Set the current state of the target virtual character to the second state corresponding to the second state identifier.

Figure 11:
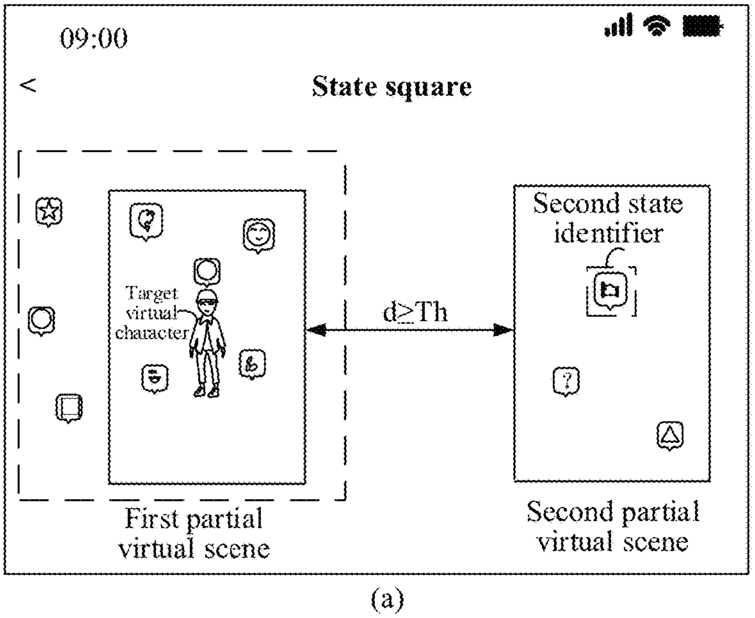
FIG. 11 is a schematic diagram of state copying and state setting after virtual scene switching according to an aspect of this disclosure.
Figure 11:
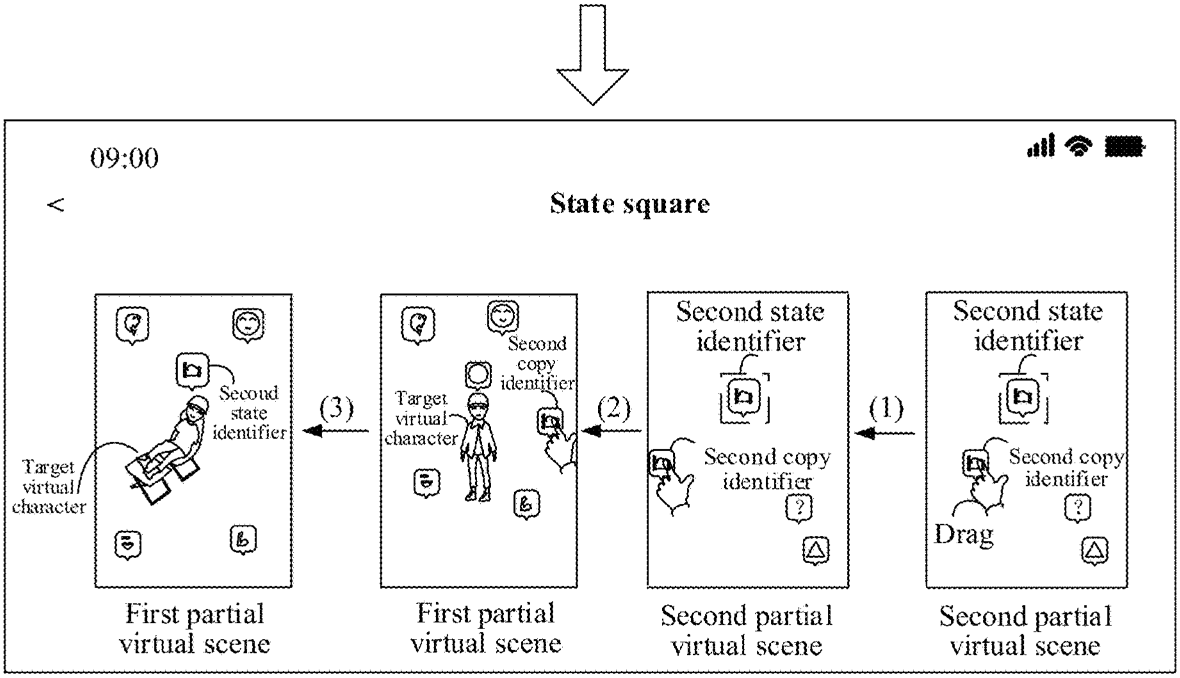

For example, as shown in section (b) of FIG. 11, assuming that a state corresponding to the second state identifier is a sleeping state, the current state of the target virtual character is set to the sleeping state through the foregoing operation S1102 to operation S1110.

Example 2

Figure 12:
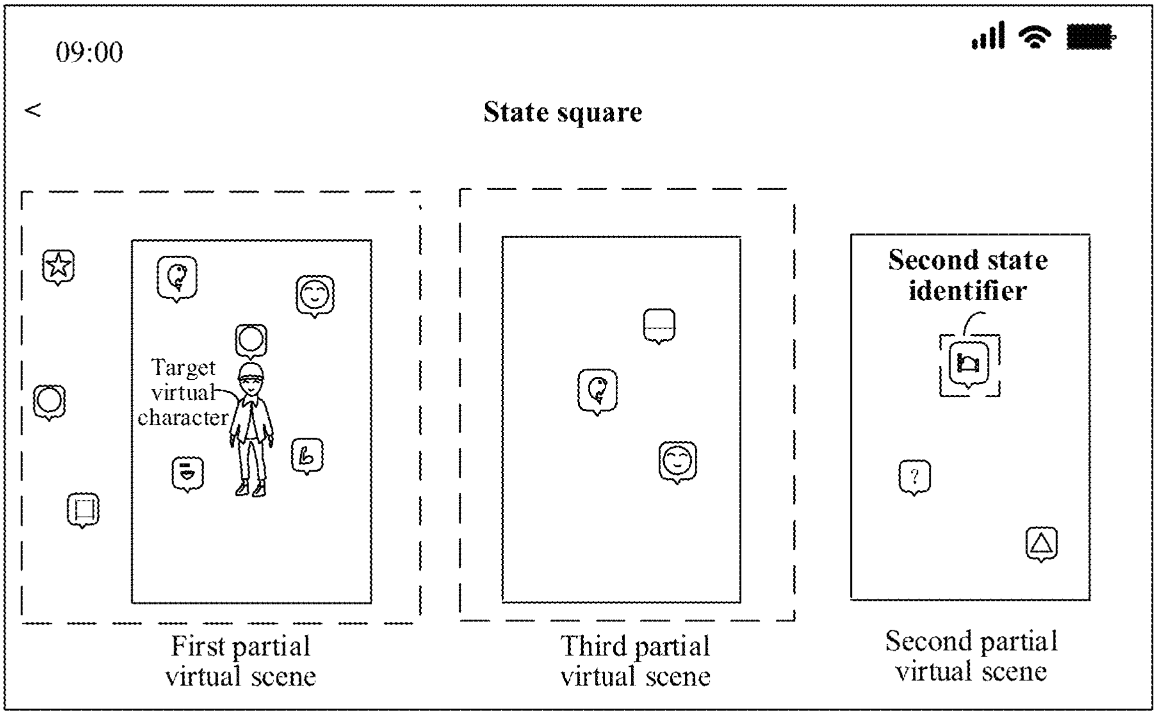
FIG. 12 is a schematic diagram of state copying and state setting after virtual scene switching according to an aspect of this disclosure.
Figure 12:
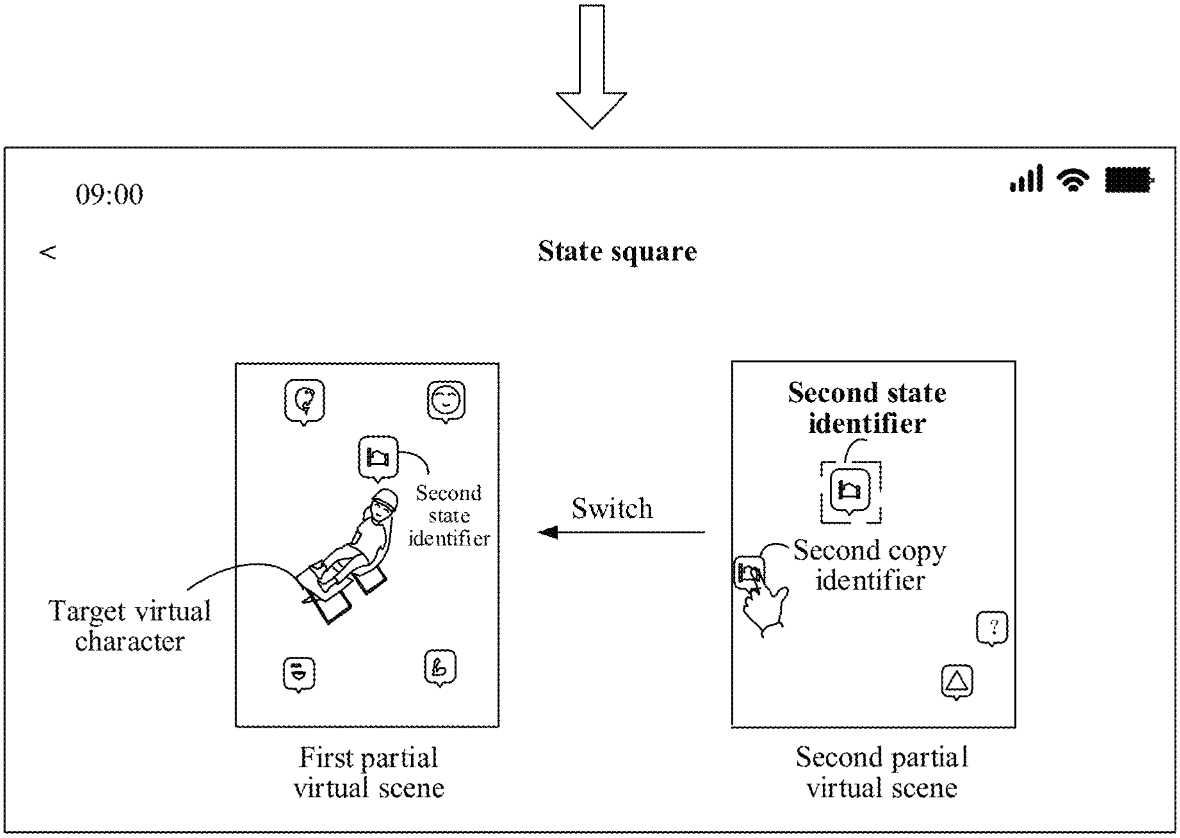

As shown in section (a) of FIG. 12, it is assumed that there is a third partial virtual scene between a first partial virtual scene and a second partial virtual scene. In other words, there is no overlapping portion between the first partial virtual scene and the second partial virtual scene.

As shown in section (b) of FIG. 12, in the second partial virtual scene, a second state identifier is touched and held to enter a state copy mode, and a second copy identifier is displayed. The second copy identifier is the same as the second state identifier. When the second copy identifier is moved away from the second partial virtual scene, a virtual scene displayed in a state display interface is switched from the second partial virtual scene to the first partial virtual scene. In addition, the second copy identifier is moved to the first partial virtual scene.

When the second copy identifier is moved to a preset determining area in the first partial virtual scene, the second copy identifier is used for a target virtual character, so that a state identifier of the target virtual character is updated to the second copy identifier. In addition, a current state of the target virtual character is updated to a second state corresponding to the second copy identifier, for example, a sleeping state.

It may be learned from the foregoing Example 1 and Example 2 that after the virtual scene in the state display interface is switched, based on a distance between the virtual scenes after switch, different manners may be used to set a state that the user wants. This improves flexibility of setting the state of the target virtual character and improves applicability of state setting.

As an example, in a case that the current state of the target virtual character is set to the second state corresponding to the second state identifier, the method further includes:

migrating a display position of the state identifier of the second virtual character from the second partial virtual scene to the first partial virtual scene if a number of times a target state is copied reaches a preset times threshold within preset duration, the number of times a target state is copied representing a number of times the current state of the second virtual character is copied for the target virtual character, and the first partial virtual scene being a partial virtual scene displayed by default when the state display interface is opened.

Figure 13:
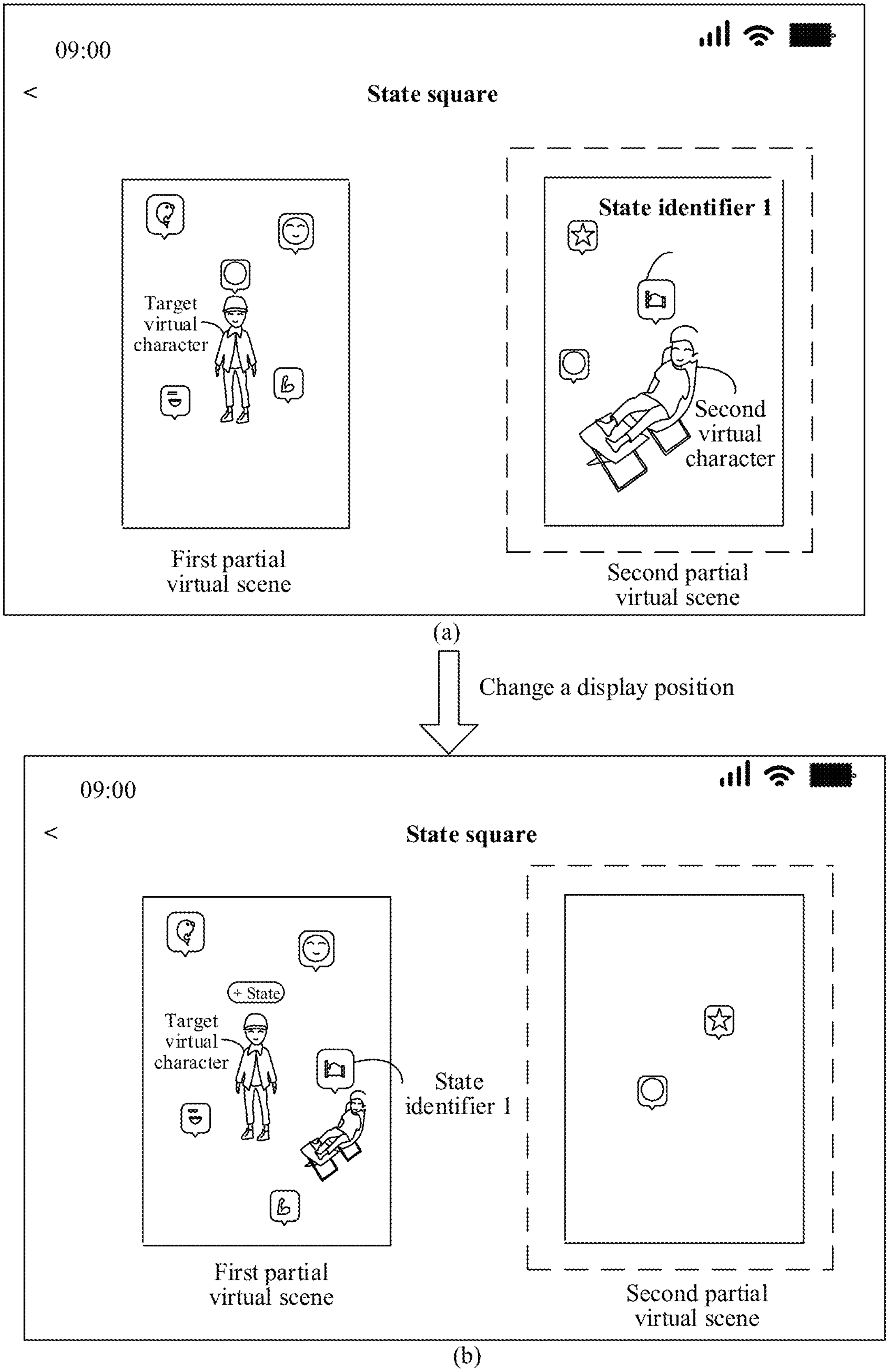
FIG. 13 is a schematic diagram of change of a display position of a state identifier according to an aspect of this disclosure.

As shown in section (a) of FIG. 13, it is assumed that a second virtual character is located in a second partial virtual scene, and a state identifier of the second virtual character is state identifier 1, and a target virtual character is located in a first partial virtual scene. In a historical period, it is assumed that a number of times state identifier 1 is copied is six, and a preset times threshold is five. In this case, a display position of state identifier 1 is switched from the second partial virtual scene to the first partial virtual scene, so that a distance between state identifier 1 and the target virtual character is close, specifically, as shown in section (b) of FIG. 13.

The display position of state identifier 1 is changed because the second virtual character is determined as a close friend of the target virtual character based on the number of times state identifier 1 is copied. In addition, for state identifier 1 frequently set by the user, state identifier 1 is displayed close to the target virtual character, for example, is displayed in the first partial virtual scene, to improve convenience of performing a trigger operation on state identifier 1 and further improve response efficiency of state setting.

As an example, in a case that the current state of the target virtual character is set to the first state corresponding to the first state identifier, the method further includes:

transmitting state notification information to a first account, the first virtual character being a virtual character controlled by the first account, and the state notification information being configured for prompting the first account that the current state of the first virtual character is copied for the target virtual character.

Figure 14:
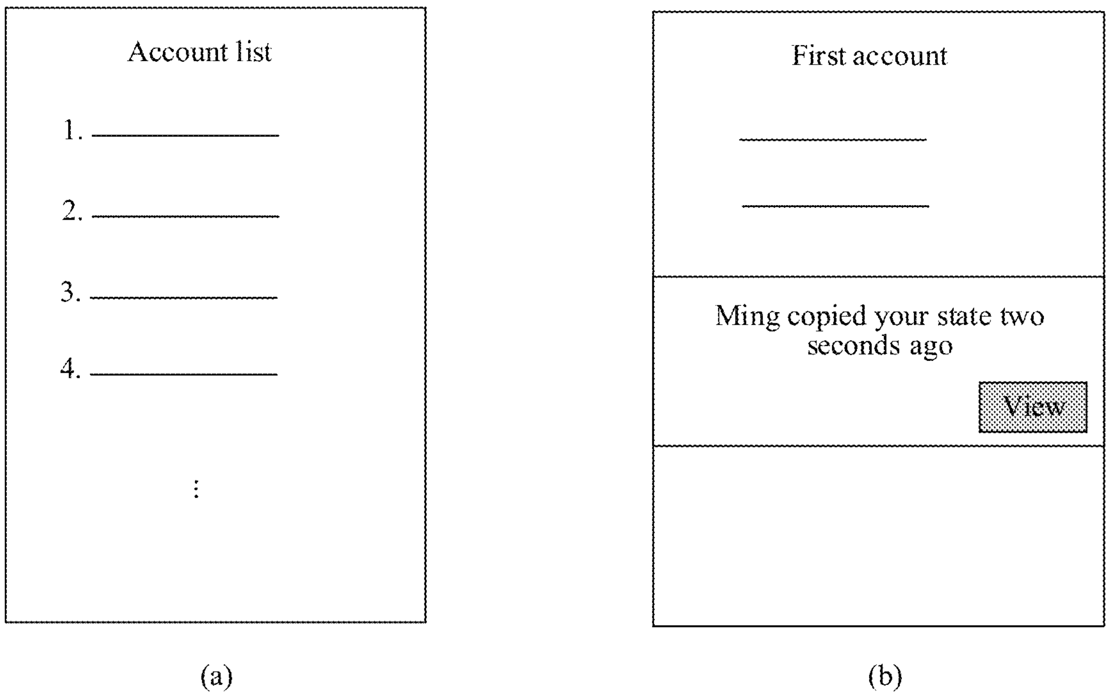
FIG. 14 is a schematic diagram of a message notification after state copying according to an aspect of this disclosure.

As shown in section (a) of FIG. 14, it is assumed that the target application includes an account list. The account list includes a plurality of different accounts, and each account corresponds to a virtual character and an initial state icon of the virtual character.

It is assumed that the first virtual character in FIG. 3 is a virtual character controlled by the first account. A trigger operation is performed to copy the first state identifier, and state notification information, for example, "Ming copied your state two seconds ago", shown in section (b) of FIG. 14 is displayed in a session bar of the first account after the first state represented by the first copy identifier is set to the current state of the target virtual character, to notify the first account that the virtual character controlled by the first account is copied by the target account. In addition, the first account may view an action animation and a state identifier of the target virtual character after state updating in the virtual scene by selecting a "view" option.

According to the foregoing state notification manner, after the virtual character state is copied, the copied first account may be notified in a timely manner. This increases entertainment value of virtual social. In addition, the copied first account may further view an updated state of the target virtual character in a timely manner based on the notification information. This improves timeliness of obtaining state copy information.

Figure 15:
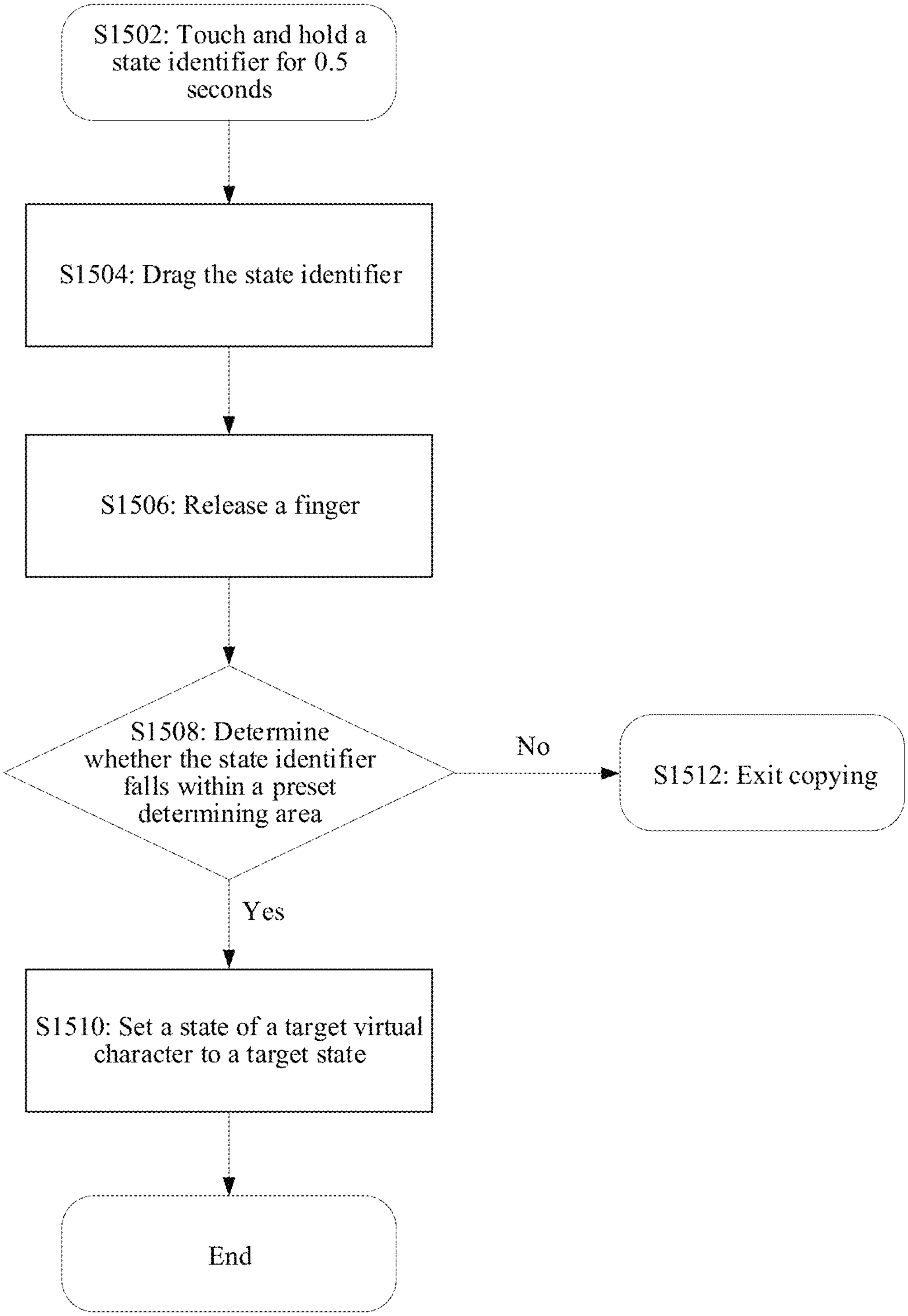
FIG. 15 is an entire flowchart of a virtual character state setting method according to an aspect of this disclosure.

To better understand the foregoing virtual character state setting method in this disclosure, the following further describes the virtual character state setting method with reference to an entire flowchart shown in FIG. 15.

S1502: The user touches and holds a state identifier to enter a state copy mode.

For example, as shown in section (b) of FIG. 11, after the second state identifier is touched and held for 0.5 seconds, the second copy identifier is displayed.

S1504: Drag the second copy identifier in a state display interface.

The second copy identifier is moved following a second drag operation, and before the second drag operation is released, the second copy identifier may be moved to a different display position in a same partial virtual scene or in a different partial virtual scene.

S1506: Release a finger to release a drag operation.

S1508: Determine whether the state identifier is moved to a preset determining area.

For example, if the state identifier is not moved to the preset determining area where a target virtual character is located when the drag operation is released, a copy operation is exited, as in operation S1512.

If the state identifier is moved to the preset determining area where a target virtual character is located when the drag operation is released, operation S1510 is performed.

S1510: Set a state of the target virtual character to a target state.

For example, as shown in section (b) of FIG. 11, the state of the target virtual character is set to the second state corresponding to the second state identifier, for example, a sleeping state.

After the state is set, the second copy identifier in dragging is used for the target virtual character and disappears from a first partial virtual scene.

S1512: Exit copying.

Figure 16:
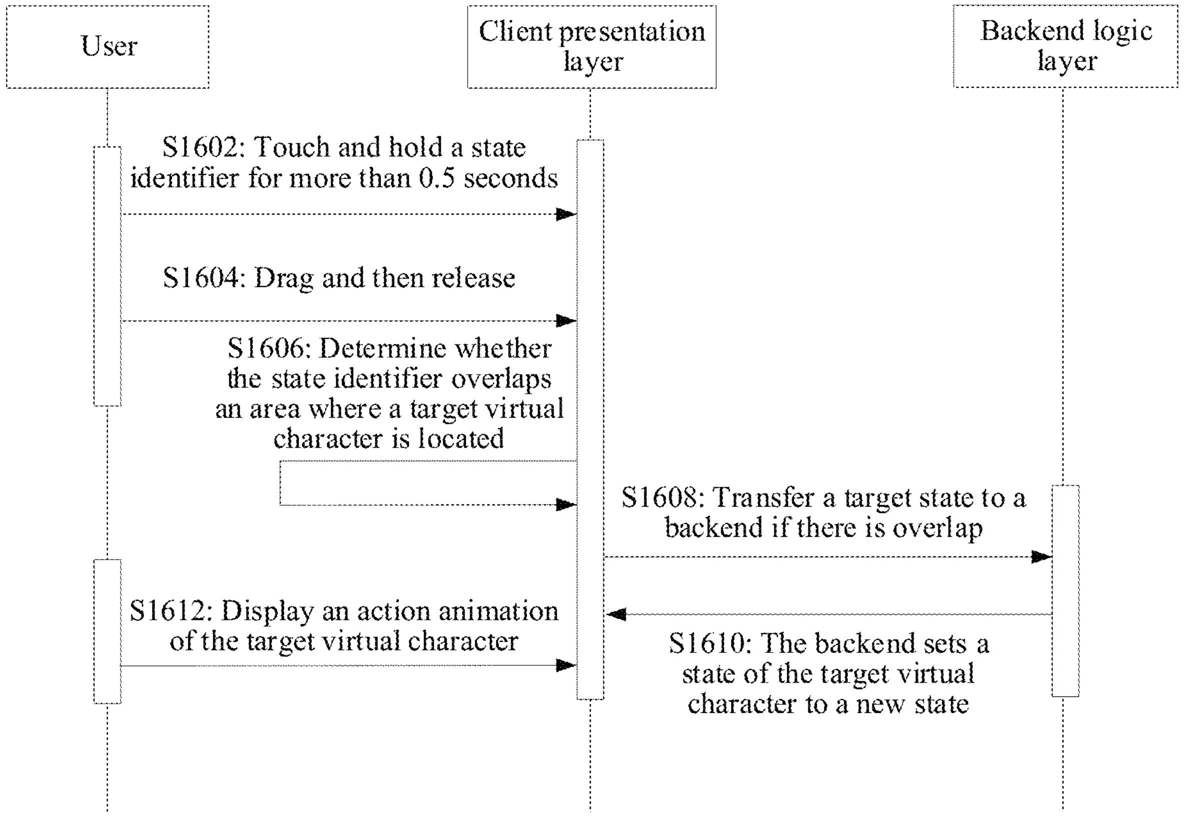
FIG. 16 is a sequence diagram of a virtual character state setting method according to an aspect of this disclosure.

To understand various examples of this disclosure more clearly, with reference to a sequence diagram shown in FIG. 16, the foregoing virtual character state setting method is described from an interaction process between a target account (a user), a client (a product side), and a backend (a logic layer). Specifically, the method includes the following operations.

S1602: The user performs a touch and hold operation on a target state identifier.

For example, after the target state identifier is touched and held for 0.5 seconds, a state copy mode is entered, and a copy identifier that is the same as the target state identifier is displayed in a state display interface.

S1604: Drag the copy identifier and release a drag operation at a specified position.

S1606: Determine whether the copy identifier overlaps an area where a target virtual character is located.

A determining criterion includes, but is not limited to, the preset determining area where the target virtual character is located shown in section (c) of FIG. 6, and the preset area in the state display interface shown in section (a) of FIG. 7.

S1608: Transmit a state ID of a target state to a backend in a case that a determining result is that there is area overlap.

Each virtual character state corresponds to a state ID.

S1610: The backend sets a state of the target virtual character to a new state.

It is clear that the new state is a state represented by the target state identifier, for example, the sleeping state corresponding to the second state identifier shown in section (b) of FIG. 11.

S1612: Display an action animation of the target virtual character in the new state in a target application where the target account is located.

According to the foregoing example of this disclosure, a one-key operation is performed on the first state identifier in the state display interface to set the state of the target virtual character to the same state as the first virtual character, avoiding switch between different display interfaces and reducing operations in a plurality of display interfaces, so that a technical problem of high complexity in setting a virtual character state is resolved and convenience of setting a virtual character state is improved.

For each of the foregoing method examples, for ease of description, the method examples are described as a series of action combination. But a person skilled in the art is to know that this disclosure is not limited to any described sequence of the action, as some operations can use other sequences or can be executed simultaneously according to this disclosure. In addition, a person skilled in the art is also to know that the related actions and modules are not necessarily mandatory to this disclosure.

Figure 17:
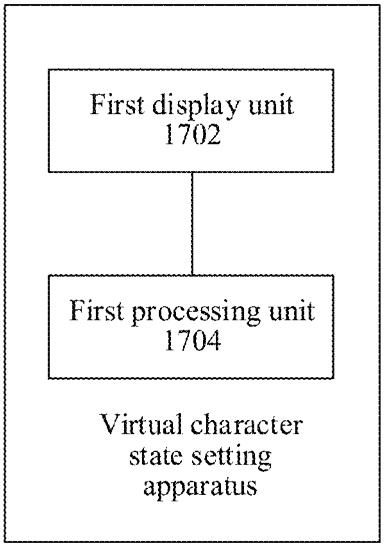
FIG. 17 is a schematic diagram of a structure of a virtual character state setting apparatus according to an aspect of this disclosure.

According to another aspect of this disclosure, the virtual character state setting apparatus as shown in FIG. 17 is further provided. The apparatus includes:

a first display unit 1702, configured to display state identifiers of a first group of virtual characters and a target virtual character in a state display interface of a target application, the target virtual character being a virtual character controlled by a target account currently logged in to the target application; and a first processing unit 1704, configured to set, in response to a trigger operation on a first state identifier in the state display interface, a current state of the target virtual character to a first state corresponding to the first state identifier, and display a state identifier of the target virtual character as the first state identifier in the state display interface, the first state identifier being a state identifier of a first virtual character in the first group of virtual characters, and a current state of the first virtual character being the first state.

In some examples, the foregoing first processing unit 1704 includes:

a first processing module, configured to display in the state display interface, in response to a first drag operation on the first state identifier in the state display interface, a first copy identifier that is moved following the first drag operation, the first copy identifier being the same as the first state identifier; and a first setting module, configured to set, in a case that the first copy identifier is moved to a preset determining area and the first drag operation is released, the current state of the target virtual character to the first state corresponding to the first state identifier, and display the state identifier of the target virtual character as the first state identifier in the state display interface.

In some examples, the foregoing first setting module includes:

a first processing submodule, configured to set, in a case that the first copy identifier is moved to an area that the target virtual character is located and the first drag operation is released, the current state of the target virtual character to the first state corresponding to the first state identifier, and display the state identifier of the target virtual character as the first state identifier in the state display interface, the preset determining area being the area that the target virtual character is located; or a second processing submodule, configured to set, in a case that the first copy identifier is moved to a preset area in the state display interface and the first drag operation is released, the current state of the target virtual character to the first state corresponding to the first state identifier, and display the state identifier of the target virtual character as the first state identifier in the state display interface, the preset determining area being the preset area in the state display interface.

In some examples, the foregoing first processing unit 1704 includes:

a second processing module, configured to display a state copy control in the state display interface in response to a touch and hold operation on the first state identifier in the state display interface, the state copy control being configured to copy the current state of the first virtual character to the target virtual character; and a third processing module, configured to set, in response to a trigger operation on the state copy control in the state display interface, the current state of the target virtual character to the first state corresponding to the first state identifier, and display the state identifier of the target virtual character as the first state identifier in the state display interface.

In some examples, the foregoing apparatus further includes:

a second processing unit, configured to switch a displayed virtual scene from a first partial virtual scene to a second partial virtual scene in the state display interface in response to a scene switching operation triggered in the state display interface, and display a state identifier of a second group of virtual characters located in the second partial virtual scene, the state identifiers of the first group of virtual characters being located in the first partial virtual scene; and a third processing unit, configured to set, in response to a trigger operation on a second state identifier in the state display interface, the current state of the target virtual character to a second state corresponding to the second state identifier, and display a state identifier of the target virtual character as the second state identifier in the state display interface, the second state identifier being a state identifier of a second virtual character in the second group of virtual characters, and a current state of the second virtual character being the second state.

In some examples, the foregoing third processing unit includes:

a fourth processing module, configured to display in the state display interface, in response to a second drag operation on the second state identifier in the state display interface in a case that the target virtual character is located in the first partial virtual scene, a second copy identifier that is moved following the second drag operation, the second copy identifier being the same as the second state identifier;

a fifth processing module, configured to switch the displayed virtual scene from the second partial virtual scene to the first partial virtual scene in the state display interface in a case that the second copy identifier is moved across a scene to the first partial virtual scene; and a sixth processing module, configured to set, in a case that the second copy identifier is moved to the area that the target virtual character is located and the second drag operation is released, the current state of the target virtual character to be the second state corresponding to the second state identifier, and display the state identifier of the target virtual character located in the first partial virtual scene as the second state identifier.

In some examples, the foregoing fifth processing module includes:

a third processing submodule, configured to switch, in a case that a distance between the first partial virtual scene and the second partial virtual scene is greater than or equal to a predetermined distance threshold, the displayed virtual scene from the second partial virtual scene to the first partial virtual scene in the state display interface when the second copy identifier is moved away from the second partial virtual scene;

or switch, in a case that there is no overlapping portion between the first partial virtual scene and the second partial virtual scene, the displayed virtual scene from the second partial virtual scene to the first partial virtual scene in the state display interface when the second copy identifier is moved away from the second partial virtual scene.

In some examples, the foregoing third processing unit further includes:

a seventh processing module, configured to migrate a display position of the state identifier of the second virtual character from the second partial virtual scene to the first partial virtual scene if a number of times a target state is copied reaches a preset times threshold within preset duration, the number of times a target state is copied representing a number of times the current state of the second virtual character is copied for the target virtual character, and the first partial virtual scene being a partial virtual scene displayed by default when the state display interface is opened.

In some examples, the foregoing apparatus further includes:

a fourth processing unit, configured to transmit state notification information to a first account, the first virtual character being a virtual character controlled by the first account, and the state notification information being configured for prompting the first account that the current state of the first virtual character is copied for the target virtual character.

In some examples, the foregoing apparatus further includes:

a second display unit, configured to display a third state identifier of the target virtual character in the state display interface when the state identifiers of the first group of virtual characters and the target virtual character are displayed in the state display interface of the target application, the third state identifier representing that the current state of the target virtual character is the third state; and an updating unit, configured to update the current state of the target virtual character from the third state to the first state, and update the state identifier of the target virtual character from the third state identifier to the first state identifier in the state display interface.

In some examples, the foregoing first display unit 1702 includes:

a first display module, configured to display a to-be-set-state identifier of the target virtual character in the state display interface, the to-be-set-state identifier representing that the current state of the target virtual character is null; and an eighth processing module, configured to set the current state of the target virtual character to the first state, and update the state identifier of the target virtual character from the to-be-set-state identifier to the first state identifier in the state display interface.

In some examples, the foregoing first display unit 1702 further includes:

a second display module, configured to display action animations of the first group of virtual characters in the state display interface, the action animations of virtual characters in the first group of virtual characters respectively corresponding to state identifiers of the virtual characters in the first group of virtual characters.

the foregoing first processing unit 1704 includes:

a third display module, configured to display an action animation of the target virtual character in the state display interface, both the action animation of the target virtual character and an action animation of the first virtual character corresponding to the first state identifier, and the action animation of the target virtual character being the same as the action animation of the first virtual character, or the action animation of the target virtual character being configured for showing that the target virtual character performs a first action, the action animation of the first virtual character being configured for showing that the first virtual character performs the first action, and the first action corresponding to the first state identifier.

The foregoing apparatus is used to perform a one-key operation on the first state identifier in the state display interface to set the state of the target virtual character to the same state as the first virtual character, avoiding switch between different display interfaces and reducing operations in a plurality of display interfaces, so that a technical problem of high complexity in setting a virtual character state is resolved and convenience of setting a virtual character state is improved.

For this example of the virtual character state setting apparatus here, refer to this example of the foregoing virtual character state setting method. Details are not described again herein.

Figure 18:
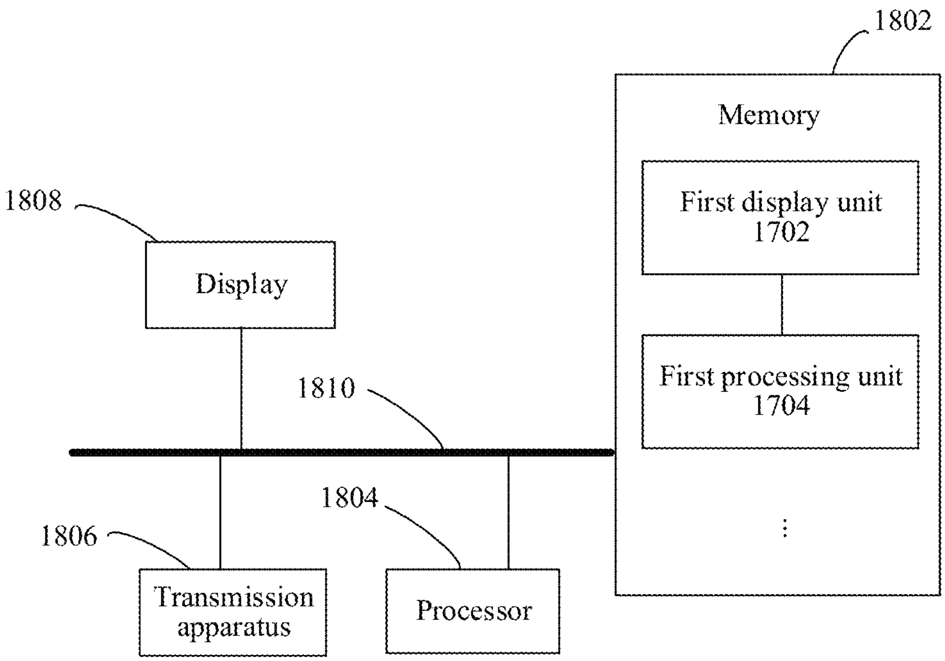
FIG. 18 is a schematic diagram of a structure of an electronic device according to an aspect of this disclosure.

According to another aspect in this disclosure, an electronic device for implementing the foregoing virtual character state setting method is further provided. The electronic device may be a terminal device as shown in FIG. 18. In this example, an example in which the electronic device is a backend device is used for description. As shown in FIG. 18, the electronic device includes a memory 1802 and a processor 1804. The memory 1802 has a computer program stored therein, and processing circuitry, such as the processor 1804 is configured to perform operations in any of the foregoing method examples by using the computer program.

In this example, the foregoing electronic device may be located in at least one of a plurality of network devices in a computer network.

In this example, the processor may be configured to perform the virtual character state setting method provided in this example of this disclosure by using the computer program.

In some examples, a person of ordinary skill in the art may understand that the structure shown in FIG. 18 is merely an example. The electronic device may alternatively be a target terminal, such as a smartphone (for example, an Android phone and an iOS phone), a tablet computer, a palmtop computer, a mobile Internet device (MID), or a PAD. FIG. 18 does not constitute a limitation on a structure of the foregoing electronic device. For example, the electronic device may further include more or fewer components (for example, a network interface) than those shown in FIG. 18, or has a configuration different from that shown in FIG. 18.

The memory 1802, such as a non-transitory computer-readable storage medium, may be configured to store a software program and a module, such as a program instruction/module corresponding to the virtual character state setting method and apparatus in this disclosure. The processor 1804 runs the software program and the module stored in the memory 1802, to perform various function applications and data processing, in other words, implement the foregoing virtual character state setting method. The memory 1802 may include a high-speed random memory, and may further include a non-volatile memory, for example, one or more magnetic storage apparatuses, a flash memory, or another non-volatile solid-state memory. In some examples, the memory 1802 may further include memories remotely disposed relative to the processor 1804, and the remote memories may be connected to a terminal over a network. Examples of the network include, but are not limited to, the Internet, an intranet, a local area network, a mobile communication network, and a combination thereof. The memory 1802 may be specifically, but is not limited to, configured to store state identifiers of a first group of virtual characters, a target account, state IDs of the state identifiers, and the like. As an example, as shown in FIG. 18, the foregoing memory 1802 may include, but is not limited to, the first display unit 1702 and the first processing unit 1704 in the virtual character state setting apparatus. In addition, the foregoing memory 1802 may further include, but is not limited to, another module unit in the foregoing virtual character state setting apparatus. Details are not described again in this example.

In some examples, a transmission apparatus 1806 is configured to receive or transmit data by using a network. Specific examples of the foregoing network include a wired network and a wireless network. In an example, the transmission device 1806 includes a network interface controller (NIC). The NIC may be connected to another network device and a router by using a network cable, to communicate with the Internet or a local area network. In an example, the transmission device 1806 is a radio frequency (RF) module. The RF module communicates with the Internet in a wireless manner.

In addition, the electronic device further includes: a display 1808, configured to display target information transmitted by the target account; and a connected bus 1810, configured to connect various module components in the foregoing electronic device.

In another example, the foregoing target terminal or server may be a node in a distributed system. The distributed system may be a blockchain system, and the blockchain system may be a distributed system formed by connecting a plurality of nodes through network communication. A peer to peer (P2P) network may be formed between the nodes. Any form of a computing device, such as the server, the terminal, and another electronic device, may become a node in the blockchain system by joining the peer-to-peer network.

According to one aspect of this disclosure, a computer program product or a computer program is provided. The computer program product or computer program includes computer instructions, and the computer instructions are stored in a computer-readable storage medium. The processor of the computer device reads the computer instructions from the computer-readable storage medium. The processor executes the computer instructions, so that the computer device performs the virtual character state setting method provided in various implementations of the foregoing server verification processing and the like. The computer program is configured to perform, when run, operations of any of the foregoing method examples.

In this example, the computer-readable storage medium may be configured to store the virtual character state setting method provided in this example of this disclosure.

In this example, a person of ordinary skill in the art may understand that, all or some operations in the methods of the foregoing examples may be completed by instructing relevant hardware of the target terminal by using a program. The program may be stored in a computer-readable storage medium. The storage medium may include: a flash drive, a read-only memory (ROM), a random access memory (RAM), a magnetic disk, an optical disc, and the like.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The sequence numbers of the foregoing disclosure are merely for description purpose but do not imply the preference among examples.

When the integrated unit in the foregoing examples is implemented in a form of a software functional unit and sold or used as an independent product, the integrated unit may be stored in the foregoing computer-readable storage medium. Based on such an understanding, the technical solutions of this disclosure essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of operations of the method in this disclosure.

In the foregoing disclosure, the descriptions of examples have respective focuses. For a part that is not described in detail in an example, refer to related descriptions in other examples.

In the several examples provided in this disclosure, the disclosed client may be implemented in another manner. The apparatus examples described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by using some interfaces, units, or modules, and may be electrical or of other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of examples.

In addition, functional units in this disclosure may be integrated into one processing unit, or each of the units may be physically separated, or two or more units may be integrated into one unit. The integrated unit may be implemented in the form of hardware, or may be implemented in a form of a software functional unit. The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The foregoing descriptions are merely examples of this disclosure, and it should be noted that, a person of ordinary skill in the art may make various improvements and refinements without departing from the spirit of this disclosure. All such modifications and refinements should also be intended to be covered by this disclosure.

What is claimed is:

1. A virtual character state setting method, the method comprising:

displaying, by an electronic device, a first plurality of virtual characters in a state display interface of an application, wherein the first plurality of virtual characters includes a target virtual character associated with a target account of the application;

displaying a to-be-set-state identifier of the target virtual character in the state display interface, the to-be-set-state identifier representing that a current state of the target virtual character is null;

configuring, in response to a copy operation on a first state identifier of a first virtual character of the first plurality of virtual characters in the state display interface, the current state of the target virtual character based on the first state identifier; and updating, in the state display interface, the to-be-set-state identifier of the target virtual character to the first state identifier to display the first state identifier as the current state of the target virtual character, the first state identifier being a state identifier from the first plurality of virtual characters.

2. The method according to claim 1, wherein the copy operation on the first state identifier in the state display interface is a first drag operation, the method further comprises:

configuring, when the first drag operation is released to a predetermined area, the current state of the target virtual character to the first state identifier.

3. The method according to claim 2, wherein the predetermined area is an area where the target virtual character is located.

4. The method according to claim 1, wherein the method further comprises:

displaying a state copy control in response to a touch and hold operation on the first state identifier in the state display interface, the state copy control being configured to copy a state of the first virtual character indicated by the first state identifier to the target virtual character; and displaying, in response to the state copy control in the state display interface, the first state identifier as the current state of the target virtual character in the state display interface.

5. The method according to claim 1, the method further comprising:

switching from a first partial virtual scene to a second partial virtual scene in the state display interface in response to a scene switching operation triggered in the state display interface; and displaying state identifiers of a second plurality of virtual characters located in the second partial virtual scene, the state identifiers of the first plurality of virtual characters being located in the first partial virtual scene.

6. The method according to claim 5, the method further comprising:

displaying, in response to a copy operation on a second state identifier in the state display interface, the current state of the target virtual character as the second state identifier in the state display interface, the second state identifier being a state identifier of a second virtual character in the second plurality of virtual characters.

7. The method according to claim 1, the method further comprising:

transmitting state notification information to a first account that is associated with the first virtual character, and the state notification information being configured for prompting the first account that the state identifier of the first virtual character is copied for the target virtual character.

8. An apparatus for virtual character state setting, the apparatus comprising:

processing circuitry configured to:

display a first plurality of virtual characters in a state display interface of an application, wherein the first plurality of virtual characters includes a target virtual character associated with a target account of the application;

display a to-be-set-state identifier of the target virtual character in the state display interface, the to-be-set-state identifier representing that a current state of the target virtual character is null;

configure, in response to a copy operation on a first state identifier of a first virtual character of the first plurality of virtual characters in the state display interface, the current state of the target virtual character based on the first state identifier; and update, in the state display interface, the to-be-set-state identifier of the target virtual character to the first state identifier to display the first state identifier as the current state of the target virtual character, the first state identifier being a state identifier from the first plurality of virtual characters.

9. The apparatus according to claim 8, the processing circuitry configured to:

configure, when a first drag operation is released to a predetermined area, the current state of the target virtual character to the first state identifier, wherein the copy operation on the first state identifier in the state display interface is the first drag operation.

10. The apparatus according to claim 9, the processing circuitry configured to:

release the first drag operation in the predetermined area where the target virtual character is located.

11. The apparatus according to claim 8, the processing circuitry configured to:

display a state copy control in response to a touch and hold operation on the first state identifier in the state display interface, the state copy control being configured to copy a state of the first virtual character indicated by the first state identifier to the target virtual character; and display, in response to the state copy control in the state display interface, the first state identifier as the current state of the target virtual character in the state display interface.

12. The apparatus according to claim 8, the processing circuitry configured to:

switch from a first partial virtual scene to a second partial virtual scene in the state display interface in response to a scene switching operation triggered in the state display interface; and display state identifiers of a second plurality of virtual characters located in the second partial virtual scene, the state identifiers of the first plurality of virtual characters being located in the first partial virtual scene.

13. The apparatus according to claim 12, the processing circuitry configured to:

display, in response to a copy operation on a second state identifier in the state display interface, the current state of the target virtual character as the second state identifier in the state display interface, the second state identifier being a state identifier of a second virtual character in the second plurality of virtual characters.

14. A non-transitory computer-readable storage medium, storing instructions which when executed by a processor cause the processor to perform:

displaying a first plurality of virtual characters in a state display interface of an application, wherein the first plurality of virtual characters includes a target virtual character associated with a target account of the application;

displaying a to-be-set-state identifier of the target virtual character in the state display interface, the to-be-set-state identifier representing that a current state of the target virtual character is null;

configuring, in response to a copy operation on a first state identifier of a first virtual character of the first plurality of virtual characters in the state display interface, the current state of the target virtual character based on the first state identifier; and updating, in the state display interface, the to-be-set-state identifier of the target virtual character to the first state identifier to display the first state identifier as the current state of the target virtual character, the first state identifier being a state identifier from the first plurality of virtual characters.

15. The non-transitory computer-readable storage medium according to claim 14, wherein the instructions when executed by the processor further cause the processor to perform:

configuring, when a first drag operation is released to a predetermined area, the current state of the target virtual character to the first state identifier, wherein the copy operation on the first state identifier in the state display interface is the first drag operation.

16. The non-transitory computer-readable storage medium according to claim 15, wherein the predetermined area is an area where the target virtual character is located.

17. The non-transitory computer-readable storage medium according to claim 14, wherein the instructions when executed by the processor further cause the processor to perform:

displaying a state copy control in response to a touch and hold operation on the first state identifier in the state display interface, the state copy control being configured to copy a state of the first virtual character indicated by the first state identifier to the target virtual character; and displaying, in response to the state copy control in the state display interface, the first state identifier as the current state of the target virtual character in the state display interface.

18. The non-transitory computer-readable storage medium according to claim 14, wherein the instructions when executed by the processor further cause the processor to perform:

switching from a first partial virtual scene to a second partial virtual scene in the state display interface in response to a scene switching operation triggered in the state display interface; and displaying state identifiers of a second plurality of virtual characters located in the second partial virtual scene, the state identifiers of the first plurality of virtual characters being located in the first partial virtual scene.

19. The non-transitory computer-readable storage medium according to claim 18, wherein the instructions when executed by the processor further cause the processor to perform:

displaying, in response to a copy operation on a second state identifier in the state display interface, the current state of the target virtual character as the second state identifier in the state display interface, the second state identifier being a state identifier of a second virtual character in the second plurality of virtual characters.

* * * * *